(12) United States Patent
Kurimoto et al.

(10) Patent No.: US 10,525,913 B2
(45) Date of Patent: Jan. 7, 2020

(54) ELECTRONIC CONTROL DEVICE

(71) Applicant: Hitachi Automotive Systems, Ltd., Hitachinaka-shi, Ibaraki (JP)

(72) Inventors: Hirofumi Kurimoto, Hitachinaka (JP); Mitsuhiko Watanabe, Hitachinaka (JP)

(73) Assignee: HITACHI AUTOMOTIVE SYSTEMS, LTD., Hitachinaka-shi (JP)

(*) Notice: Subject to any disclaimer, the term of this patent is extended or adjusted under 35 U.S.C. 154(b) by 268 days.

(21) Appl. No.: 15/315,080

(22) PCT Filed: Jun. 8, 2015

(86) PCT No.: PCT/JP2015/066431
§ 371 (c)(1),
(2) Date: Nov. 30, 2016

(87) PCT Pub. No.: WO2015/190421
PCT Pub. Date: Dec. 17, 2015

(65) Prior Publication Data
US 2017/0190307 A1    Jul. 6, 2017

(30) Foreign Application Priority Data

Jun. 10, 2014  (JP) ................................ 2014-119249

(51) Int. Cl.
*B60R 16/03*    (2006.01)
*B60R 16/033*   (2006.01)
(Continued)

(52) U.S. Cl.
CPC ............ *B60R 16/033* (2013.01); *G05B 15/02* (2013.01); *G05F 1/56* (2013.01); *H02M 3/158* (2013.01); *H02P 1/16* (2013.01)

(58) Field of Classification Search
CPC ....... H02M 3/158; H02M 3/1588; G05F 1/56; B60R 16/033
See application file for complete search history.

(56) References Cited

U.S. PATENT DOCUMENTS 6,304,089 B1* 10/2001 Paulson ............... G01R 31/026
                                                324/509
7,298,095 B2* 11/2007 Nukisato ............... H02M 3/156
                                                315/291
(Continued)

FOREIGN PATENT DOCUMENTS

JP  05-127765 A   5/1993
JP  11-265225     3/1998
(Continued)

OTHER PUBLICATIONS

Extended European Search Report issued in corresponding application No. 15807336.1 dated Mar. 14, 2018.

*Primary Examiner* — Tuan C Dao
(74) *Attorney, Agent, or Firm* — Foley & Lardner LLP

(57) ABSTRACT

The present invention addresses the problems of: providing a power supply system that does not cause a microcontroller to reset even when an abnormality occurs in the output of a third power supply within a battery voltage range in which an electronic control device ensures operation; and achieving said power supply system at low cost. An electronic control device is provided with: a first power supply circuit that outputs a predetermined voltage; a second power supply circuit that is disposed downstream from the first power supply circuit and that outputs a predetermined voltage; and a third power supply circuit that is disposed downstream from the first power supply circuit and that outputs a predetermined voltage. The electronic control device is characterized by comprising a means that makes it possible to switch the circuit operation state of the third power supply circuit in accordance with the states of the first to third power supply circuits. The electronic control device is also characterized by comprising a means that makes it possible to switch the circuit operation state of the third power supply (Continued)

circuit using only a state detection signal that is generated from the state of the third power supply circuit.

12 Claims, 20 Drawing Sheets

(51) Int. Cl.
    *G05F 1/56*           (2006.01)
    *G05B 15/02*         (2006.01)
    *H02M 3/158*       (2006.01)
    *H02P 1/16*           (2006.01)

(56) References Cited

U.S. PATENT DOCUMENTS

| | | | |
|---|---|---|---|
| 7,544,077 B1* | 6/2009 | Martin | H01R 25/161 |
| | | | 200/16 R |
| 2004/0075423 A1 | 4/2004 | Itabashi et al. | |
| 2004/0218330 A1* | 11/2004 | Natili | H02H 1/0023 |
| | | | 361/115 |
| 2005/0275995 A1* | 12/2005 | Noguchi | H01H 71/32 |
| | | | 361/160 |
| 2006/0120002 A1* | 6/2006 | Asada | H03K 17/0822 |
| | | | 361/103 |
| 2006/0164021 A1* | 7/2006 | Ryu | H02M 1/08 |
| | | | 315/209 R |
| 2007/0057870 A1* | 3/2007 | Kamada | G09G 3/2927 |
| | | | 345/66 |
| 2007/0217238 A1* | 9/2007 | Kanayama | H02M 3/155 |
| | | | 363/125 |
| 2008/0222436 A1* | 9/2008 | Matsui | G06F 1/26 |
| | | | 713/320 |
| 2008/0232015 A1* | 9/2008 | Wakabayashi | B60T 8/321 |
| | | | 361/79 |
| 2008/0284389 A1 | 11/2008 | Kawase et al. | |
| 2009/0184700 A1 | 7/2009 | Kanayama | |
| 2010/0026265 A1 | 2/2010 | Kuno et al. | |
| 2010/0135050 A1* | 6/2010 | Sonobe | H02M 1/36 |
| | | | 363/21.07 |
| 2012/0292984 A1 | 11/2012 | Iwagami et al. | |
| 2015/0224946 A1 | 8/2015 | Sato et al. | |

FOREIGN PATENT DOCUMENTS

| | | |
|---|---|---|
| JP | H11-265225 A | 9/1999 |
| JP | 2003-092874 A | 3/2003 |
| JP | 2004-153931 A | 5/2004 |
| JP | 2008-46720 A | 2/2008 |
| JP | 2008-289254 A | 11/2008 |
| JP | 2009-177909 A | 8/2009 |
| JP | 2010-039703 A | 2/2010 |
| JP | 2012-244658 A | 12/2012 |
| JP | 2013-156874 A | 8/2013 |
| WO | WO-2014/007272 A1 | 1/2014 |

\* cited by examiner

ELECTRONIC CONTROL DEVICE

TECHNICAL FIELD

The present invention relates to an electronic control device with a power supply control device that adjusts an input source voltage from the outside to a predetermined voltage and supplies appropriate voltage and current to a power supply target.

BACKGROUND ART

An electronic control unit (ECU) electronically controlling an engine or a transmission is equipped with a power supply control device that uses an onboard battery voltage as an input voltage from the outside, adjusts the battery voltage to a predetermined voltage, and supplies appropriate voltage and current to various power supply targets. Examples of the power supply target include a microcontroller or various integrated circuits (ICs) mounted in the ECU and various sensors connected to the outside of the ECU. Since voltages to be supplied to the power supply targets are generally lower than the onboard battery voltage, the power supply control device steps down the onboard battery voltage to voltages suitable for input voltages of the power supply targets.

Recently, vehicles equipped with an idling stop system that stops idling of an engine when a vehicle stops as measures for improvement in fuel efficiency have increased more and more. It is necessary to drive a starter when the engine is restarted from an idling stop state, but the driving of the starter requires supply of power from a battery and thus a temporary decrease in battery voltage. Accordingly, since the ECU more frequently requires an operation at a low battery voltage, it is necessary to guarantee a satisfactory operation at a low battery voltage. There is demand for a power supply control device that can maintain supply of appropriate voltage and current to a power supply target even at a low battery voltage.

Conventionally, a power supply control device including a step-down switching regulator and a series regulator in consideration of power conversion efficiency and output voltage ripples is known as such a type of power supply control device (for example, see PTL 1). In general, the step-down switching regulator enables power conversion at higher efficiency than that of the series regulator, but the output voltage ripple is larger than that of the series regulator, which may cause a problem, for example, when the step-down switching regulator is used for a reference voltage of an analog-to-digital (AD) conversion circuit. Accordingly, by converting the battery voltage into a predetermined voltage as an intermediate voltage at high efficiency using the step-down switching regulator and stepping down the intermediate voltage to a voltage suitable for the power supply target using the series regulator, the power conversion efficiency and the output voltage ripple of the power supply control device are made to be compatible with each other.

FIG. 17 is a diagram illustrating a configuration of an electronic control device according to a conventional example.

A power supply control device 4 includes a first power supply 1, a second power supply 2, and a third power supply 3.

A battery voltage 41 is input as an input voltage to the power supply control device 4, and the battery voltage 41 is input to the first power supply 1 via a reverse connection prevention diode 42.

The first power supply 1 is a step-down switching regulator and steps down a first power supply input voltage 44 to a first power supply output voltage 17. The first power supply 1 includes a switching element 11, a freewheel diode 15, an inductor 14, and a first voltage control circuit 12. When the first voltage control circuit 12 instructs turning-on, the switching element 11 supplies the first power supply input voltage 44 to the inductor 14 and supplies a current to the rear stage of the first power supply 1. On the other hand, when the first voltage control circuit 12 instructs turning-off, the switching element 11 does not supply the first power supply input voltage 44 to the inductor 14 side and supplies a current to the rear stage of the first power supply 1 by discharging energy stored in the inductor 14 via the freewheel diode 15. In this way, a switching output voltage 13 is the first power supply input voltage 44 when the first voltage control circuit 12 instructs turning-on, and is a reference potential 45 when the first voltage control circuit 12 instructs turning-off. The first voltage control circuit 12 monitors the first power supply output voltage 17 and controls the switching element 11 in a pulse width modulation (PWM) manner such that the first power supply output voltage 17 is a predetermined voltage.

The second power supply 2 is a series regulator that supplies a voltage to a microcontroller 5. The second power supply 2 includes a second power supply output transistor 21 and a second voltage control circuit 22. The second voltage control circuit 22 monitors a second power supply output voltage 24 and controls the second power supply output transistor 21 using the first power supply output voltage 17 as an input voltage such that the second power supply output voltage 24 is a predetermined voltage.

The third power supply 3 is a series regulator that supplies a voltage to, for example, a sensor outside the electronic control device, other than the microcontroller 5. The third power supply 3 includes a third power supply output transistor 31 and a third voltage control circuit 32. The third voltage control circuit 32 monitors a third power supply output voltage 34 and controls the third power supply output transistor 31 using the first power supply output voltage 17 as an input voltage such that the third power supply output voltage 34 is a predetermined voltage. In the following description, it is assumed that the third power supply output voltage 34 is controlled to the same voltage as the second power supply output voltage 24.

The power supply control device 4 includes a voltage generating function control register 36 for the third power supply 3. When a third power supply output-ON control signal 110a is transmitted to the voltage generating function control register 36 by serial communication or the like, the voltage generating function control register 36 becomes high, the third power supply 3 is turned on, and the third voltage control circuit 32 monitors the third power supply output voltage 34 and controls the third power supply output transistor 31 such that the third power supply output voltage 34 is a predetermined voltage. On the other hand, when a third power supply output-OFF control signal 110b is transmitted to the voltage generating function control register 36 by serial communication or the like, the voltage generating function control register 36 becomes low, the third power supply 3 is turned off, and thus the third power supply output transistor 31 is turned off to stop the supply of power as a power supply.

The microcontroller 5 generally has a guaranteed operating range for a source voltage, and when a source voltage outside the guaranteed operating range is supplied, the operation of the microcontroller 5 is not guaranteed. Accordingly, when the source voltage of the microcontroller 5 is outside the guaranteed operating range, a reset signal 71 is output to the microcontroller 5 to prevent an unexpected operation of the microcontroller 5. In order to generate the reset signal 71 using the power supply control device 4, the power supply control device 4 includes a second power supply low output voltage detection circuit 25 for the second power supply output voltage 24. The second power supply low output voltage detection circuit 25 detects a low voltage of the second power supply output voltage 24 and outputs a second power supply low output voltage detection output signal 72, and a reset signal generation circuit 71a generates the reset signal 71 and outputs the reset signal 71 to the microcontroller 5 when the second power supply output voltage 24 is continuously in the low-voltage state.

A suppliable current value, that is, a current capacity, is set in circuit configuration for each of the first power supply 1, the second power supply 2, and the third power supply 3. When a current larger than the current capacity is drawn out from the power supply output, voltage control of stepping down a voltage to a predetermined voltage is not possible and a voltage value lower than a target voltage value is acquired. Particularly, since the third power supply 3 supplies a voltage to an ECU-outside sensor, there is a possibility that a signal line of the third power supply output voltage 34 will be grounded. In this case, a third power supply output current is equal to or larger than the current capacity, which causes the above-mentioned phenomenon.

As described above, the second power supply 2 and the third power supply 3 are regulators connected to the rear stage of the first power supply 1. Accordingly, a first power supply output current is the total sum of the second power supply output current and the third power supply output current.

Now, operations of the power supplies at a low battery voltage at which the battery voltage 41 is low and the first power supply input voltage 44 is equal to or lower than a step-down control voltage value of the first power supply 1 will be described.

The first power supply 1 cannot control the first power supply output voltage 17 to a predetermined voltage value due to an insufficient input voltage on the basis of characteristics of the step-down switching regulator. Since the first power supply output voltage 17 is equal to or lower than the step-down control voltage value of the first power supply 1, the switching element 11 is controlled to be fully turned on to increase the first power supply output voltage 17. At this time, the first power supply output voltage 17 is a voltage which is obtained by subtracting an ON-resistance value of the switching element 11, a series resistance value of the inductor 14, and a voltage drop determined by the first power supply output current value from the first power supply input voltage 44.

The second power supply 2 uses the first power supply output voltage 17 which is lower than a normal voltage as an input voltage and controls the second power supply output voltage 24 to a predetermined voltage. In the series regulator, a minimum potential difference (a dropout voltage) between an input and an output is set on the basis of the characteristics of the output transistor. Accordingly, the second power supply output voltage 24 is controlled to a target voltage value when a difference between the first power supply output voltage 17 and a control voltage value of the second power supply 2 is equal to or higher than the dropout voltage, but becomes a voltage obtained by subtracting the dropout voltage from the first power supply output voltage 17 due to an insufficient input voltage when the difference between the first power supply output voltage 17 and the control voltage value of the second power supply 2.

The third power supply 3 exhibits the same behavior as the second power supply 2, and the third power supply output voltage 34 is controlled to a target voltage value when a difference between the first power supply output voltage 17 and a control voltage value of the third power supply 3 is equal to or higher than the dropout voltage, but becomes a voltage obtained by subtracting the dropout voltage from the first power supply output voltage 17 due to an insufficient input voltage when the difference between the first power supply output voltage 17 and the control voltage value of the third power supply 3.

When the guaranteed operating range of the battery voltage of the electronic control device includes the above-mentioned low battery voltage, it is necessary to set the ON-resistance value of the switching element 11 of the first power supply 1, the series resistance value of the inductor 14, the dropout voltage of the second power supply 2, and the dropout voltage of the third power supply 3 in consideration of the above-mentioned details and current consumption of a power supply target at the time of design. Here, the ON-resistance value of the switching element 11 of the first power supply 1, the dropout voltage of the second power supply 2, and the dropout voltage of the third power supply 3 greatly depend on the areas of the output transistors used in the power supplies. Specifically, in order to decrease the ON-resistance value of the switching element 11 of the first power supply 1, it is necessary to increase the area of the output transistor used in the switching element 11. In order to the dropout voltages of the second power supply 2 and the third power supply 3, it is necessary to increase the areas of the output transistors of the second power supply 2 and the third power supply 3.

As described above, since the third power supply 3 supplies a voltage to a sensor outside the electronic control device, there is a possibility that the signal line of the third power supply output voltage 34 will be grounded. When this phenomenon occurs, the third power supply output current becomes larger than the current consumption of the power supply target and increases up to the current capacity of the third power supply 3 in maximum. The increase in the third power supply output current is an increase in the first power supply output current.

A case in which a ground failure of the third power supply output voltage 34 occurs at a low battery voltage will be described below with reference to FIG. 18.

When a ground failure occurs in the third power supply output voltage 34, a first power supply output current 66 increases with an increase in a third power supply output current 68. The first power supply 1 controls the switching element 11 to be fully turned on at a low battery voltage. Accordingly, when the first power supply output voltage 17 decreases with an increase in the first power supply output current 66, the input voltage of the second power supply 2 is insufficient and the second power supply output voltage 24 cannot be controlled with a control voltage 61 for the second power supply. Until the second power supply output voltage 24 is stabilized to a voltage obtained by subtracting the dropout voltage from the first power supply output voltage 17, electric charges accumulated in a second power supply output capacitor 23 supplies current consumption of the microcontroller 5 which is a supply target of the second power supply 2.

In this way, when the second power supply output voltage 24 decreases and is lower than a second power supply low output voltage detection threshold 64, the second power supply low output voltage detection output signal 72 is generated and the reset signal 71 is output to the microcontroller 5 after a reset signal generation filtering time 75. Accordingly, when a ground failure of the third power supply output voltage 34 occurs at a low battery voltage, the battery voltage is within the guaranteed operating range of the electronic control device but the power supply control device 4 stops the operating of the microcontroller 5 and thus there is a problem in that the electronic control device cannot function normally.

In order to avoid the above-mentioned problem, a method of decreasing the ON-resistance value of the switching element 11 of the first power supply 1 and the dropout voltage of the second power supply 2 so as for the power supply control device to control the second power supply output voltage 24 to a target voltage value is used in consideration of a case in which the ground failure of the third power supply output voltage 34 occurs at a low battery voltage. However, this method causes an increase in area of the output transistor which is used in the power supply control device as described above, thereby causing an increase in cost of the power supply control device. In consideration of a state in which the ground failure of the third power supply output voltage 34 does not occur, specifications having excessive characteristics are obtained, thereby interfering with optimization of the function and the cost.

A problem in a case in which the battery voltage 41 is disconnected while a ground failure occurs in the third power supply output voltage 34 will be described below with reference to FIGS. 19 and 20.

FIG. 19 is a timing chart in a case in which the battery voltage 41 is disconnected when a ground failure does not occur in the third power supply output voltage 34.

When the battery voltage 41 is disconnected, a power supply control device input capacitor 43 functions as a battery of the power supply control device and the power supply control device operates, but electric charges accumulated in the power supply control device input capacitor 43 decrease with the operation of the power supply control device and thus the first power supply input voltage 44 gradually decreases. When the second power supply output voltage 24 also decreases with the decrease in the first power supply input voltage 44 and becomes lower than the second power supply low output voltage detection threshold 64, the second power supply low output voltage detection output signal 72 is generated and the reset signal 71 is output to the microcontroller 5 after the reset signal generation filtering time 75.

When a ground failure does not occur in the third power supply output voltage 34 and the second power supply output voltage 24 is higher than a microcontroller guaranteed operating voltage range lower limit 62, the reset signal 71 is output and the operation of the microcontroller 5 is limited to an operation within the guaranteed operating range for the source voltage of the microcontroller 5. Accordingly, the microcontroller 5 operates as designed.

FIG. 20 is a timing chart in a case in which the battery voltage 41 is disconnected when a ground failure occurs in the third power supply output voltage 34.

When a ground failure occurs in the third power supply output voltage 34, the first power supply output current 66 increases with the increase in the third power supply output current 68. With the increase in the first power supply output current 66, a decreasing speed of the first power supply input voltage 44 after the battery voltage 41 is disconnected is higher than that when a ground failure does not occur in the third power supply output voltage 34 and the decreasing speed of the second power supply output voltage 24 also becomes higher. Accordingly, when the second power supply output voltage 24 is lower than the microcontroller guaranteed operating voltage range lower limit 62, there is a possibility that the reset signal 71 will be output. That is, there is a possibility that the operation of the microcontroller 5 is not limited to an operation within the guaranteed operating range for the source voltage of the microcontroller 5 and thus the microcontroller 5 performs an unexpected operation.

CITATION LIST

Patent Literature

PTL 1: Japanese Patent Application Laid-Open No. 2012-244658

SUMMARY OF INVENTION

Technical Problem

An object of the present invention is to provide a power supply system that does not generate a reset signal to a microcontroller even when abnormality occurs in an output of a third power supply within a battery voltage range in which an operation of an electronic control device is guaranteed and to realize the power supply system with a low cost.

Solution to Problem

In order to solve the above issue, an electronic control device according to the present invention includes: a first power supply circuit that outputs a predetermined voltage; a second power supply circuit that is disposed downstream from the first power supply circuit and outputs a predetermined voltage; a third power supply circuit that is disposed downstream from the first power supply circuit and outputs a predetermined voltage; and a unit configured to switch a circuit operating state of the third power supply circuit depending on states of the first to third power supply circuits.

The electronic control device may further include a unit configured to switch the circuit operating state of the third power supply circuit using only a state detection signal generated from the third power supply circuit state.

Advantageous Effects of Invention

According to the electronic control device according to the present invention, even when ground failure occurs in a sensor power supply outside the electronic control device within the battery voltage range in which the operation of the electronic control device is guaranteed, appropriate voltage and current can be continuously supplied to the microcontroller and a reset signal is not output thereto. Accordingly, the electronic control device can function normally.

Even when the battery voltage is disconnected while a ground failure occurs in the sensor power supply outside the electronic control device, a reset signal is output within the guaranteed operating range for the source voltage of the microcontroller and it is thus possible to prevent the microcontroller from performing an unexpected operation.

It is possible to realize such an electronic control device with a low cost.

DESCRIPTION OF EMBODIMENTS

Hereinafter, embodiments will be described with reference to the accompanying drawings.

First Embodiment

Figure 1:
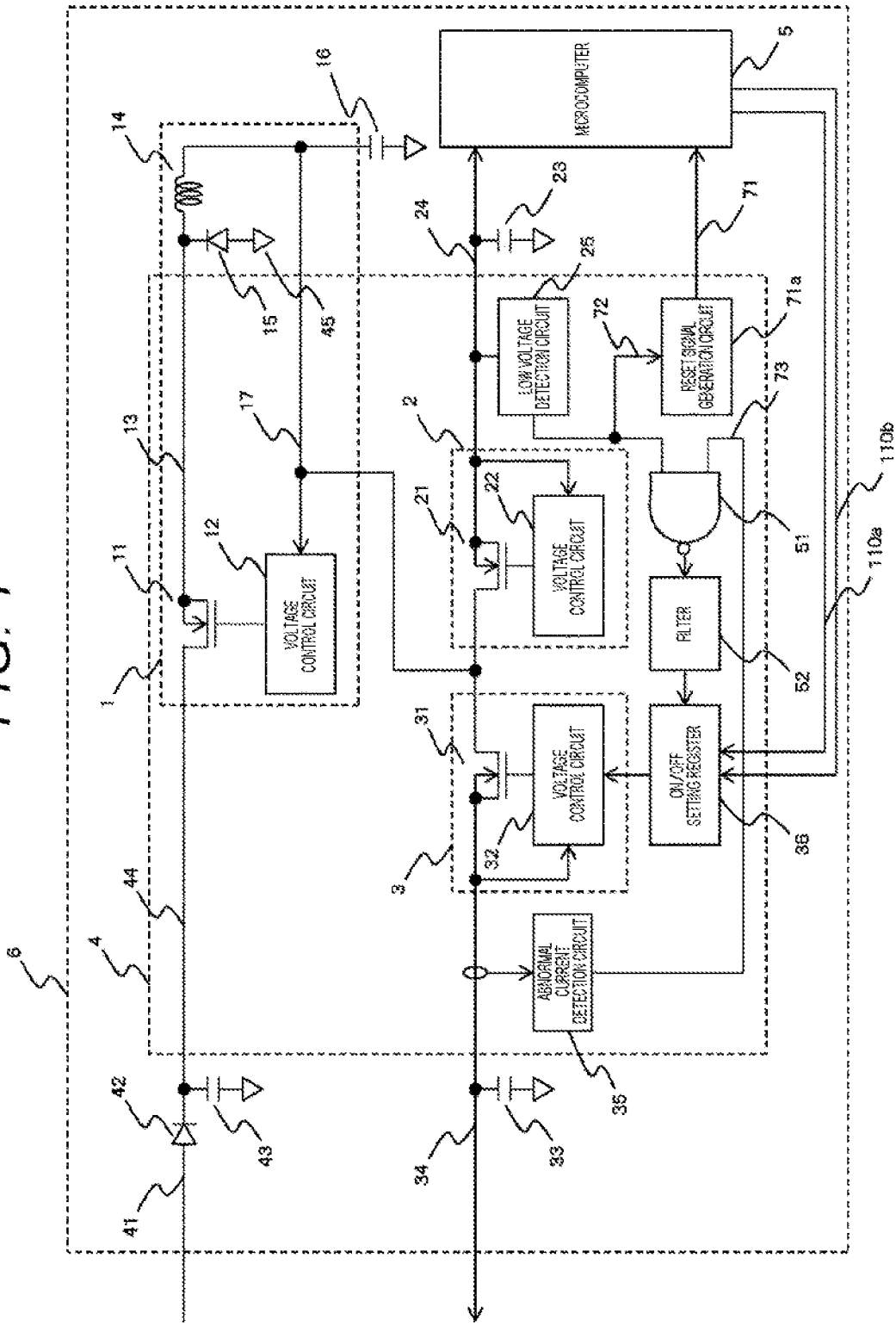
FIG. 1 is a diagram illustrating a configuration of a power supply control device according to a first embodiment.

FIG. 1 is a diagram illustrating a configuration of an electronic control device according to a first embodiment.

In describing the first embodiment, a difference from the conventional example described in the background art will be described and the same details will not be repeated.

When a third power supply output current is larger than a predetermined current value, a third power supply abnormal current detection circuit 35 determines that the third power supply output current is abnormal, and outputs a third power supply abnormal output current detection output signal 73.

The second power supply low output voltage detection output signal 72 is a signal output when the second power supply low output voltage detection circuit 25 determines that the second power supply output voltage 24 is a low voltage.

A NAND circuit 51 is a circuit that outputs a negative logical signal using the third power supply abnormal output current detection output signal 73 and the second power supply low output voltage detection output signal 72 as input signals. The output signal of the NAND circuit 51 is transmitted to a voltage generating function control register 36 via a filter circuit 52 having a predetermined filtering time.

In the first embodiment, the configuration illustrated in FIG. 1 is provided. Accordingly, when the voltage generating function control register 36 is at a high level, that is, the third power supply 3 is turned on, and a low signal is transmitted from the NAND circuit 51 to the voltage generating function control register 36 via the filter circuit 52, the third power supply 3 is turned off by forcibly switching the voltage generating function control register 36 to a low level.

Figure 2:
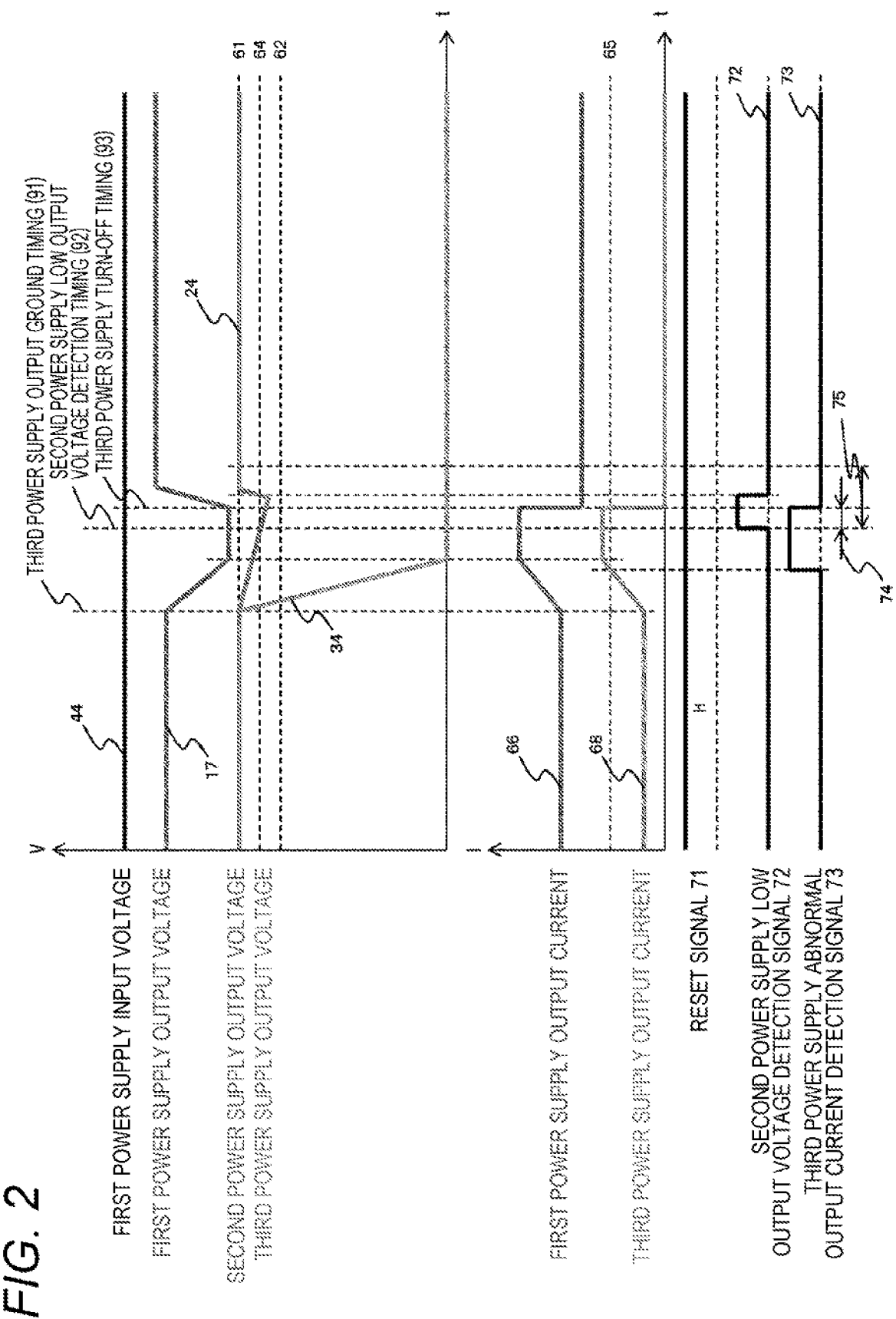
FIG. 2 is a timing chart illustrating advantages of the first embodiment.

FIG. 2 is a timing chart illustrating advantages when a ground failure of a third power supply output voltage 34 occurs at a low battery voltage according to the first embodiment.

The third power supply output current 68 increases when a ground failure occurs in the third power supply output voltage 34, and the third power supply abnormal output current detection output signal 73 is output when the third power supply output current is larger than a third power supply abnormal output current detection threshold 65. A first power supply output current 66 increases with the increase in the third power supply output current 68. At a low battery voltage, the first power supply 1 controls a switching element 11 in a full turning-on manner. Accordingly, when the first power supply output voltage 17 decreases with the increase in the first power supply output current 66, the input voltage of the second power supply 2 is insufficient and the second power supply output voltage 24 cannot be controlled with a control voltage 61 for the second power supply. Until the second power supply output voltage 24 is stabilized to a voltage obtained by subtracting a dropout voltage from the first power supply output voltage 17, electric charges accumulated in the second power supply output capacitor 23 supply current consumption of a microcontroller which is a supply target of the second power supply 2 and thus the second power supply output voltage gradually decreases.

When the second power supply output voltage 24 decreases and is lower than the second power supply low output voltage detection threshold 64, the second power supply low output voltage detection output signal 72 is generated and the third power supply 3 is turned off in an NAND output signal filtering time 74 after the third power supply abnormal output current detection output signal 73 and the second power supply low output voltage detection output signal 72 are simultaneously output. Here, the NAND output signal filtering time 74 is set to be shorter than a reset signal generation filtering time 75.

The third power supply 3 is controlled as described above to stop the third power supply output current 68 and to decrease the first power supply output current 66. Accordingly, since the first power supply output voltage 17 which is the input voltage of the second power supply 2 increases to a normal range at a low battery voltage and the insufficiency of the input voltage of the second power supply 2 is solved, the second power supply output voltage 24 can be controlled to a predetermined voltage.

Accordingly, when a ground failure occurs in the third power supply output voltage 34 within a battery voltage range in which the operation of the electronic control device is guaranteed, the power supply control device of the electronic control device according to the present invention can maintain supply of appropriate voltage and current to the microcontroller and does not output a reset signal, and thus the electronic control device can function normally.

Figure 3:
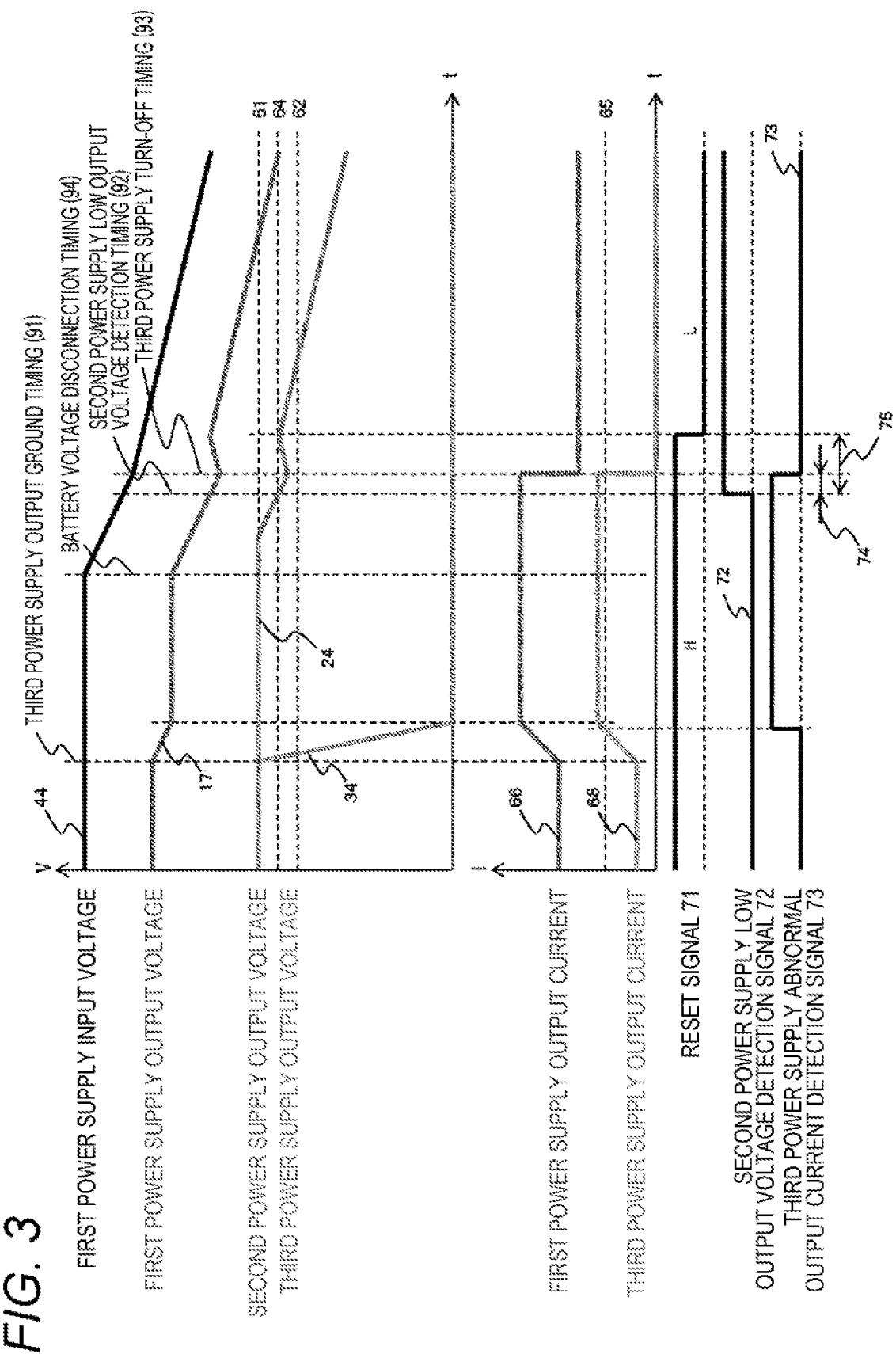
FIG. 3 is a timing chart illustrating advantages of the first embodiment.

FIG. 3 is a timing chart illustrating advantages when the battery voltage 41 is disconnected while a ground failure occurs in the third power supply output voltage 34 in the first embodiment.

The third power supply output current 68 increases when a ground failure occurs in the third power supply output voltage 34, and the third power supply abnormal output current detection output signal 73 is output when the third power supply output current 68 is larger than the third power supply abnormal output current detection threshold 65. The first power supply output current 66 increases with the increase in the third power supply output current 68. With the increase in the first power supply output current 66, the decreasing speed of the first power supply input voltage 44 after the battery voltage 41 is disconnected is higher than that in a case in which a ground failure does not occur in the third power supply output voltage 34 and the decreasing speed of the second power supply output voltage 24 also increases.

When the second power supply output voltage 24 decreases and becomes lower than the second power supply low output voltage detection threshold 64, the second power supply low output voltage detection output signal 72 is generated and the third power supply 3 is turned off in the NAND output signal filtering time 74 after the third power supply abnormal output current detection output signal 73 and the second power supply low output voltage detection output signal 72 are simultaneously output.

By controlling the third power supply 3 as described above to stop the third power supply output current 68 and to decrease the first power supply output current 66, it is possible to increase the first power supply output voltage 17 which is the input voltage of the second power supply 2 and to set the decreasing speed of the first power supply input voltage 44 to be lower than that in a case in which a ground failure does not occur in the third power supply output voltage 34. Accordingly, the reset signal 71 can be output when the second power supply output voltage 24 is higher than the microcontroller guaranteed operating voltage range lower limit 62.

Accordingly, even when the battery voltage 41 is disconnected while a ground failure occurs in the third power supply output voltage 34, the power supply control device outputs a reset signal within the guaranteed operating range for the source voltage of the microcontroller in the electronic control device according to the present invention and it is thus possible to prevent an unexpected operation of the microcontroller.

It is possible to achieve the above-mentioned advantages without increasing the area of the output transistor of each power supply in consideration of the ground failure in the third power supply output voltage 34, that is, it is possible to achieve the advantages with a low cost.

Second Embodiment

Figure 4:
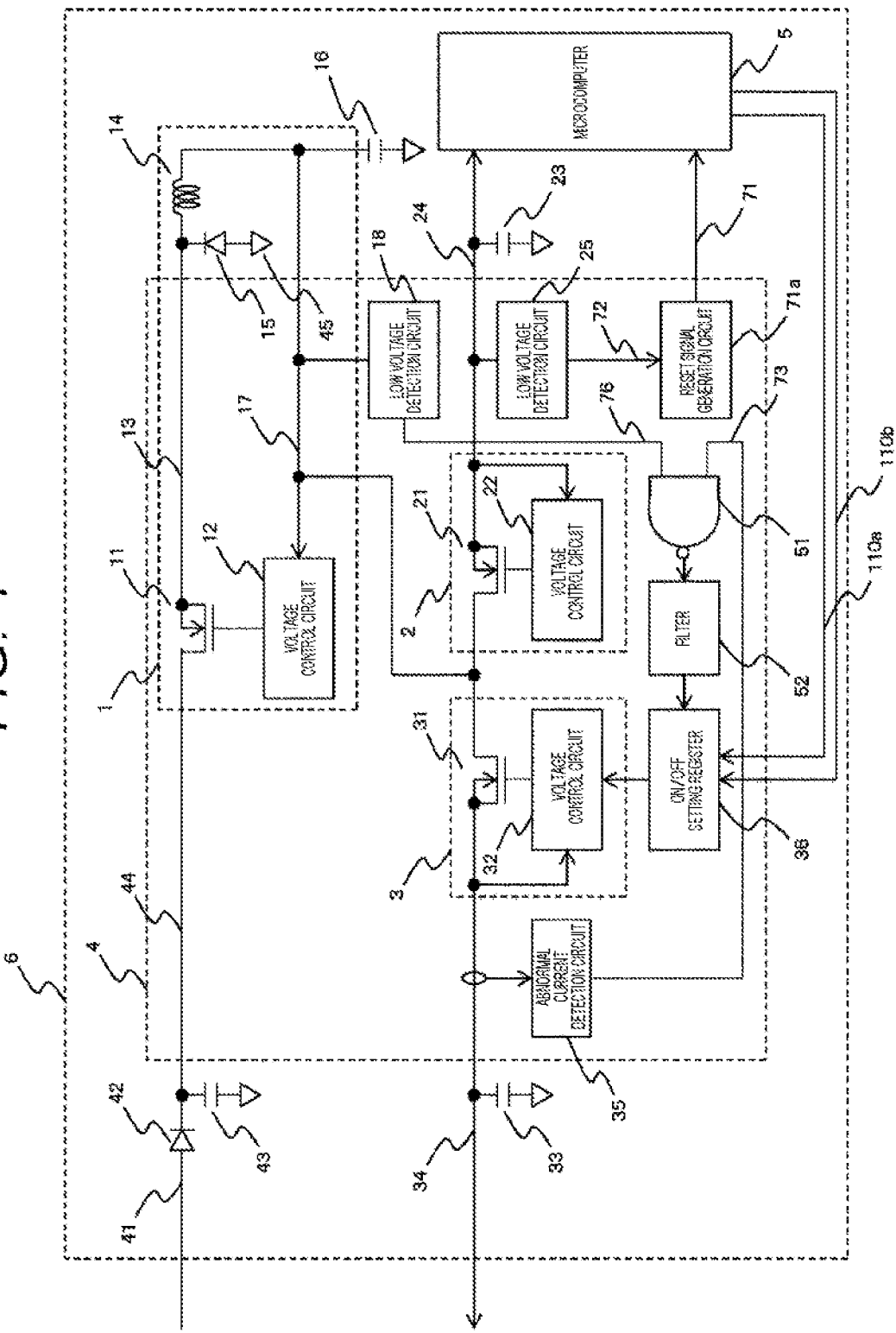
FIG. 4 is a diagram illustrating a configuration of a power supply control device according to a second embodiment.

FIG. 4 is a diagram illustrating a configuration of an electronic control device according to a second embodiment.

In describing the second embodiment, a difference from the first embodiment will be described and the same details will not be repeated.

The second embodiment is different from the first embodiment, in that a first power supply low output voltage detection circuit 18 is connected to the first power supply output voltage 17 and outputs a first power supply low input voltage detection output signal 76. The others are the same as in the first embodiment.

An operation in the second embodiment will be described below with reference to the timing chart illustrated in FIG. 5.

Figure 5:
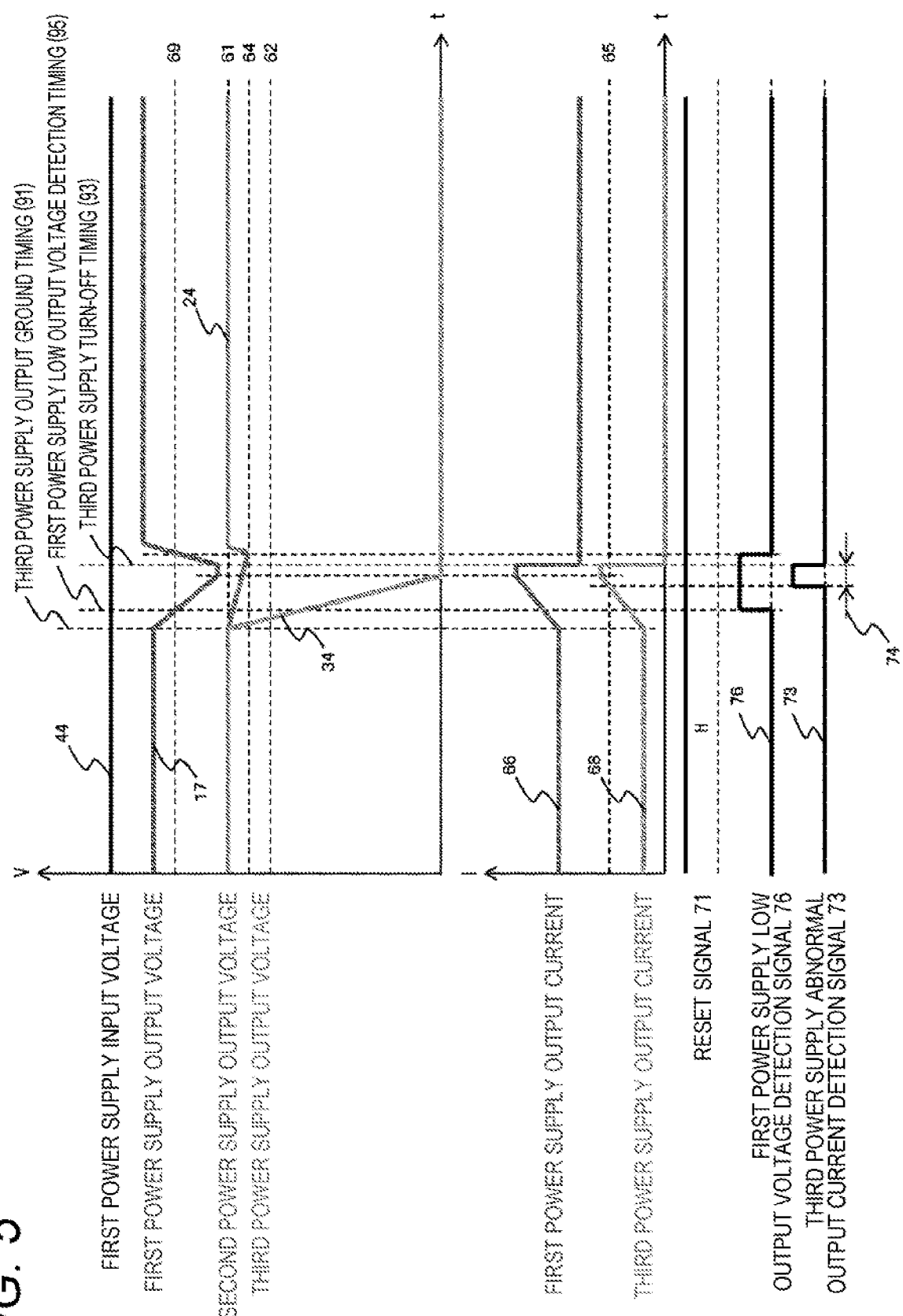
FIG. 5 is a timing chart illustrating advantages of the second embodiment.

FIG. 5 illustrates a state in which the third power supply output voltage 34 is grounded when the first power supply input voltage 44 is at a low level. When the first power supply input voltage 44 is at the low level and the third power supply output voltage 34 is grounded at a third power supply output ground timing 91, the third power supply output current 68 increases as illustrated in FIG. 5 (a short-circuit current flows). When the third power supply output voltage 34 reaches the third power supply abnormal output current detection threshold 65, this state is detected and the third power supply abnormal output current detection output signal 73 is output.

On the other hand, when the third power supply output current 68 increases due to the grounding of the third power supply output voltage 34, the first power supply output voltage 17 also decreases similar to the first embodiment. When the third power supply output current 68 reaches a first power supply low output voltage detection threshold 69 of the first power supply low output voltage detection circuit 18, the first power supply low input voltage detection output signal 76 is output at a first power supply low output voltage detection timing 95.

Accordingly, similar to the first embodiment, the third power supply abnormal output current detection output signal 73 and the first power supply low input voltage detection output signal 76 are simultaneously output, and the third power supply 3 is turned off at a third power supply OFF timing 93 to stop the third power supply output current 68 and to decrease the first power supply output current 66 after the NAND output signal filtering time 74 elapses. Accordingly, since drop of the first power supply output voltage 17 and drop of the second power supply output voltage 24 due to the short-circuit current do not occur as illustrated in FIG. 5, the second power supply 2 can control the second power supply output voltage 24 to a predetermined voltage. As a result, the reset signal 71 can be kept at a high level.

Accordingly, even when a ground failure occurs in the third power supply output voltage 34 within the battery voltage range in which the operation of the electronic control device is guaranteed, the power supply control device of the electronic control device according to the present invention can maintain supply of appropriate voltage and current to the microcontroller and does not output a reset signal, and thus the electronic control device can function normally.

Third Embodiment

Figure 6:
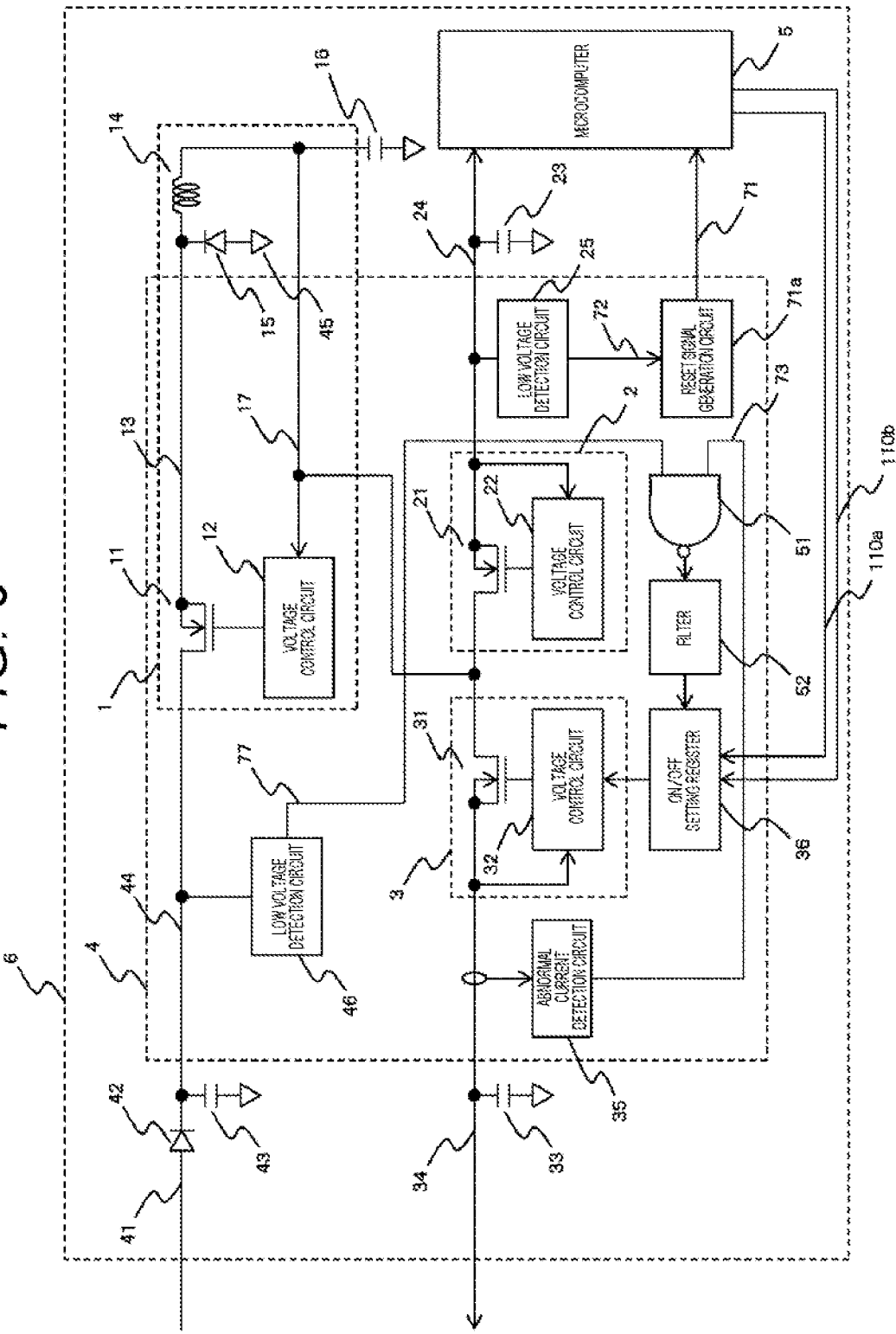
FIG. 6 is a diagram illustrating a configuration of a power supply control device according to a third embodiment.

FIG. 6 is a diagram illustrating a configuration of an electronic control device according to a third embodiment.

In describing the third embodiment, a difference from the first and second embodiments will be described and the same details will not be repeated.

The third embodiment is different from the first and second embodiments, in that a first power supply low input voltage detection circuit 46 is connected to the first power supply input voltage 44 and outputs a first power supply low input voltage detection output signal 77. The others are the same as in the first and second embodiments.

An operation in the third embodiment will be described below with reference to the timing chart illustrated in FIG. 7.

Figure 7:
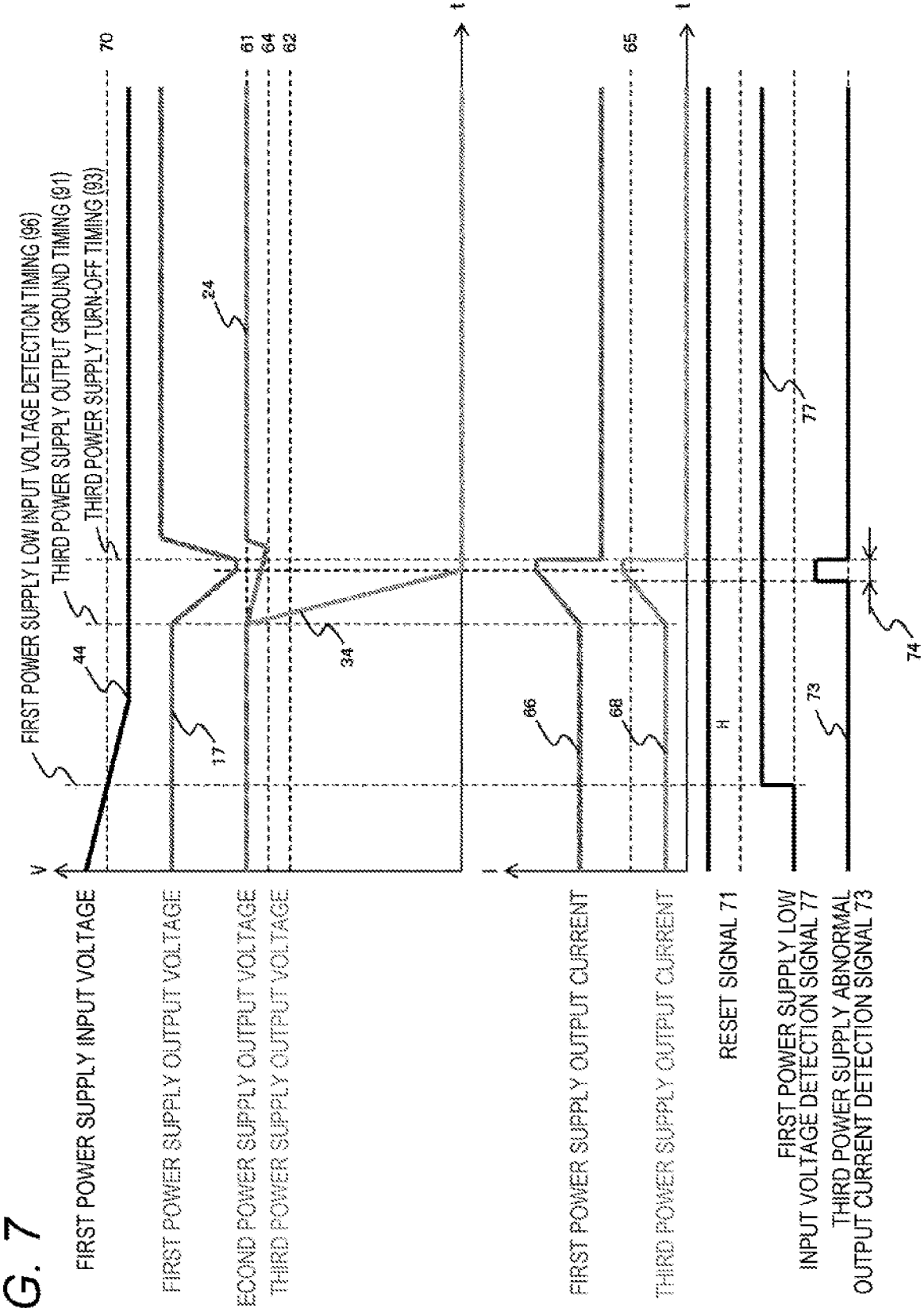
FIG. 7 is a timing chart illustrating advantages of the third embodiment.

FIG. 7 illustrates a state in which the third power supply output voltage 34 is grounded when the first power supply input voltage 44 is at a low level. When the first power supply input voltage 44 is at the low level, the decrease of the first power supply input voltage 44 is detected at a first power supply low input voltage detection timing 96 and a first power supply low input voltage detection output signal 77 is output.

On the other hand, when the third power supply output voltage 34 is grounded at the third power supply output ground timing 91, the third power supply output current 68 increases (a short-circuit current flows) as illustrated in FIG. 7. Then, when the third power supply output voltage 34 reaches the third power supply abnormal output current detection threshold 65, this state is detected and the third power supply abnormal output current detection output signal 73 is output.

Accordingly, similar to the first and second embodiments, the third power supply abnormal output current detection output signal 73 and the first power supply low input voltage detection output signal 77 are simultaneously output, and the third power supply 3 is turned off at a third power supply OFF timing 93 to stop the third power supply output current 68 and to decrease the first power supply output current 66 after the NAND output signal filtering time 74 elapses. Accordingly, since drop of the first power supply output voltage 17 and drop of the second power supply output voltage 24 due to the short-circuit current do not occur as illustrated in FIG. 7, the second power supply 2 can control the second power supply output voltage 24 to a predetermined voltage. As a result, the reset signal 71 can be kept at a high level.

Accordingly, even when a ground failure occurs in the third power supply output voltage 34 within the battery voltage range in which the operation of the electronic control device is guaranteed, the power supply control device of the electronic control device according to the present invention can maintain supply of appropriate voltage and current to the microcontroller and does not output a reset signal, and thus the electronic control device can function normally.

Fourth Embodiment

Figure 8:
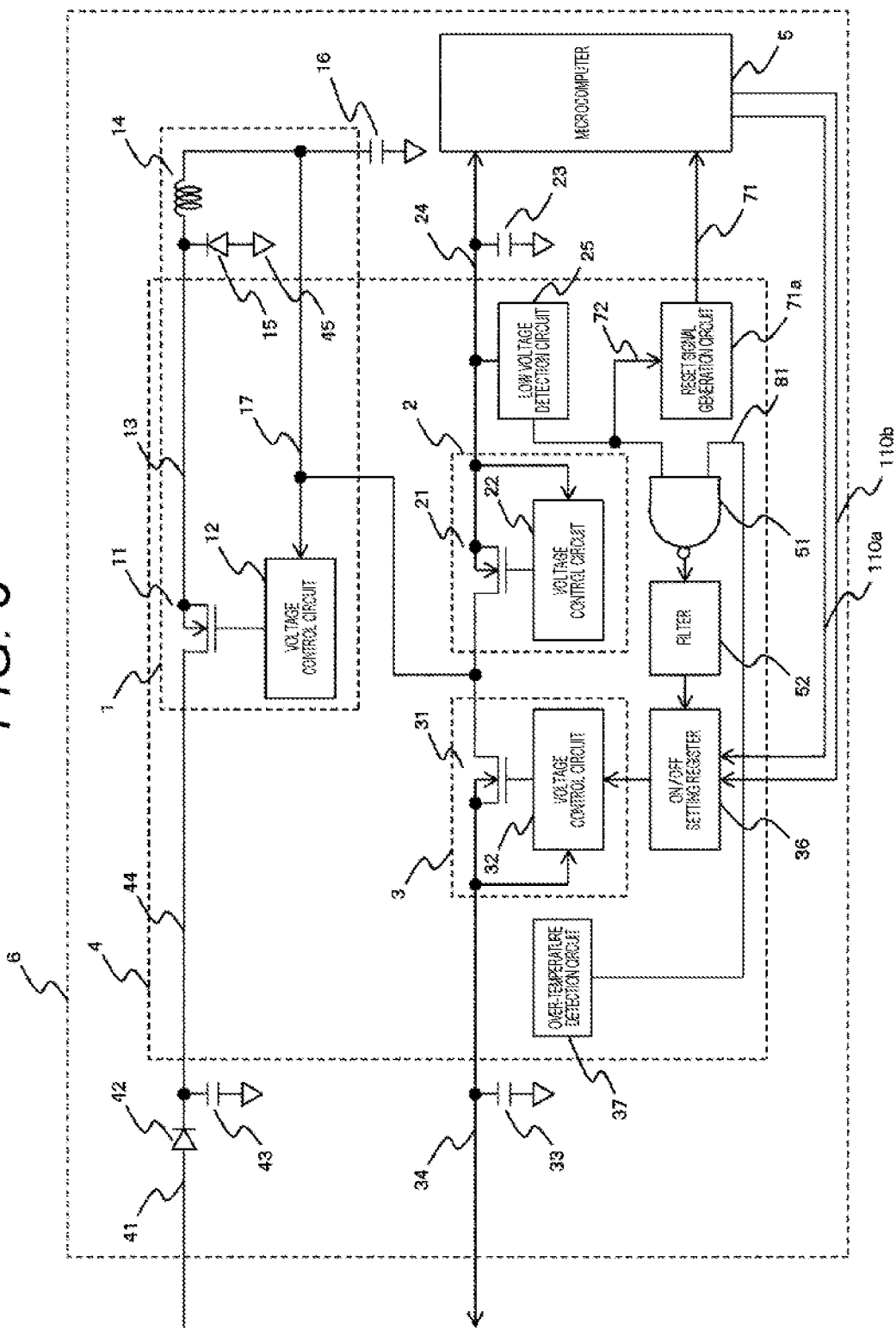
FIG. 8 is a diagram illustrating a configuration of a power supply control device according to a fourth embodiment.

FIG. 8 is a diagram illustrating a configuration of an electronic control device according to a fourth embodiment.

In describing the fourth embodiment, a difference from the first to third embodiments will be described and the same details will not be repeated.

The fourth embodiment is different from the first to third embodiments, in that a third power supply over-temperature detection circuit 37 is disposed in the vicinity of the third power supply 3 and a third power supply over-temperature detection output signal 81 is output when an abnormal temperature of the third power supply 3 is detected. The others are the same as in the first to third embodiments.

An operation in the fourth embodiment will be described below with reference to the timing chart illustrated in FIG. 9.

Figure 9:
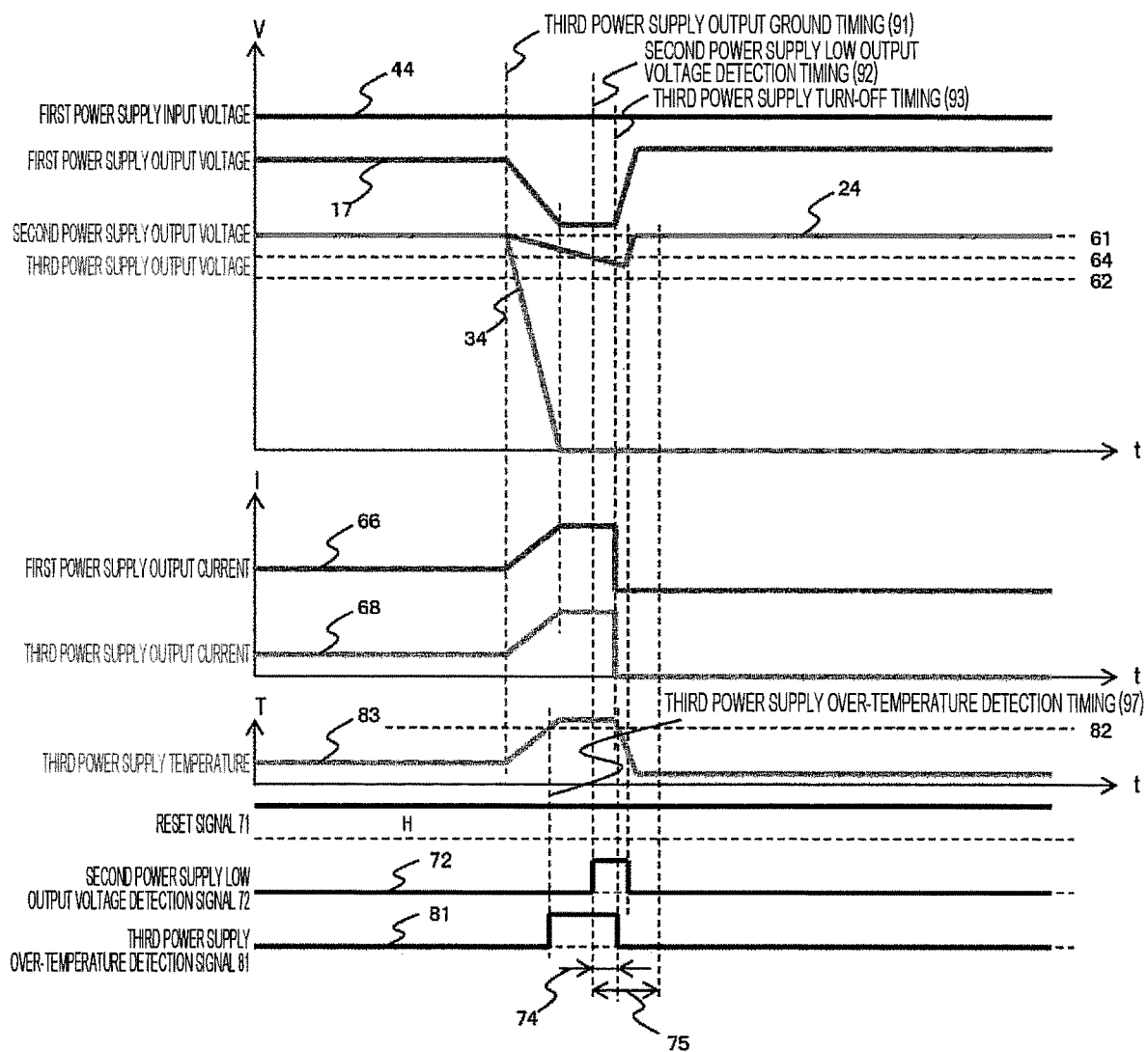
FIG. 9 is a timing chart illustrating advantages of the fourth embodiment.

FIG. 9 illustrates a state in which the third power supply output voltage 34 is grounded when the first power supply input voltage 44 is at a low level. When the third power supply output voltage 34 is grounded at the third power supply output ground timing 91 in a state in which the first power supply input voltage 44 is at the low level, the third power supply output current 68 increases (the short-circuit current flows) as illustrated in FIG. 9. Since an amount of heat is generated which is calculated using the third power supply output current 68 flowing at that time and the ON resistance value of the third power supply output transistor 31, a third power supply temperature 83 detected by the third power supply over-temperature detection circuit 37 also increases with the increase of the third power supply output current 68 as illustrated in FIG. 9. When the third power supply temperature 83 reaches a third power supply over-temperature detection threshold 82, this state is detected and the third power supply over-temperature detection output signal 81 is output at a third power supply over-temperature detection timing 97.

On the other hand, when the third power supply output current 68 flowing due to the grounding of the third power supply output voltage 34 increases, the first power supply output current 66 also increases and thus the first power supply output voltage 17 and the second power supply output voltage 24 also decrease similar to the first to third embodiments. The second power supply low output voltage detection output signal 72 is output at a second power supply low output voltage detection timing 92.

Accordingly, the third power supply over-temperature detection output signal 81 and the second power supply low output voltage detection output signal 72 are simultaneously output, and the third power supply 3 is turned off at the third power supply OFF timing 93 to stop the third power supply output current 68 and to decrease the first power supply output current 66 after the NAND output signal filtering time 74 elapses. Accordingly, since drop of the first power supply output voltage 17 and drop of the second power supply output voltage 24 due to the short-circuit current do not occur as illustrated in FIG. 9, the second power supply 2 can control the second power supply output voltage 24 to a predetermined voltage. As a result, the reset signal 71 can be kept at a high level.

Accordingly, even when a ground failure occurs in the third power supply output voltage 34 within the battery voltage range in which the operation of the electronic control device is guaranteed, the power supply control device of the electronic control device according to the present invention can maintain supply of appropriate voltage and current to the microcontroller and does not output a reset signal, and thus the electronic control device can function normally.

It is assumed that this embodiment employs the same configuration as in the first embodiment, but this embodiment can be applied to the same configuration as in the second embodiment or the third embodiment.

Fifth Embodiment

Figure 10:
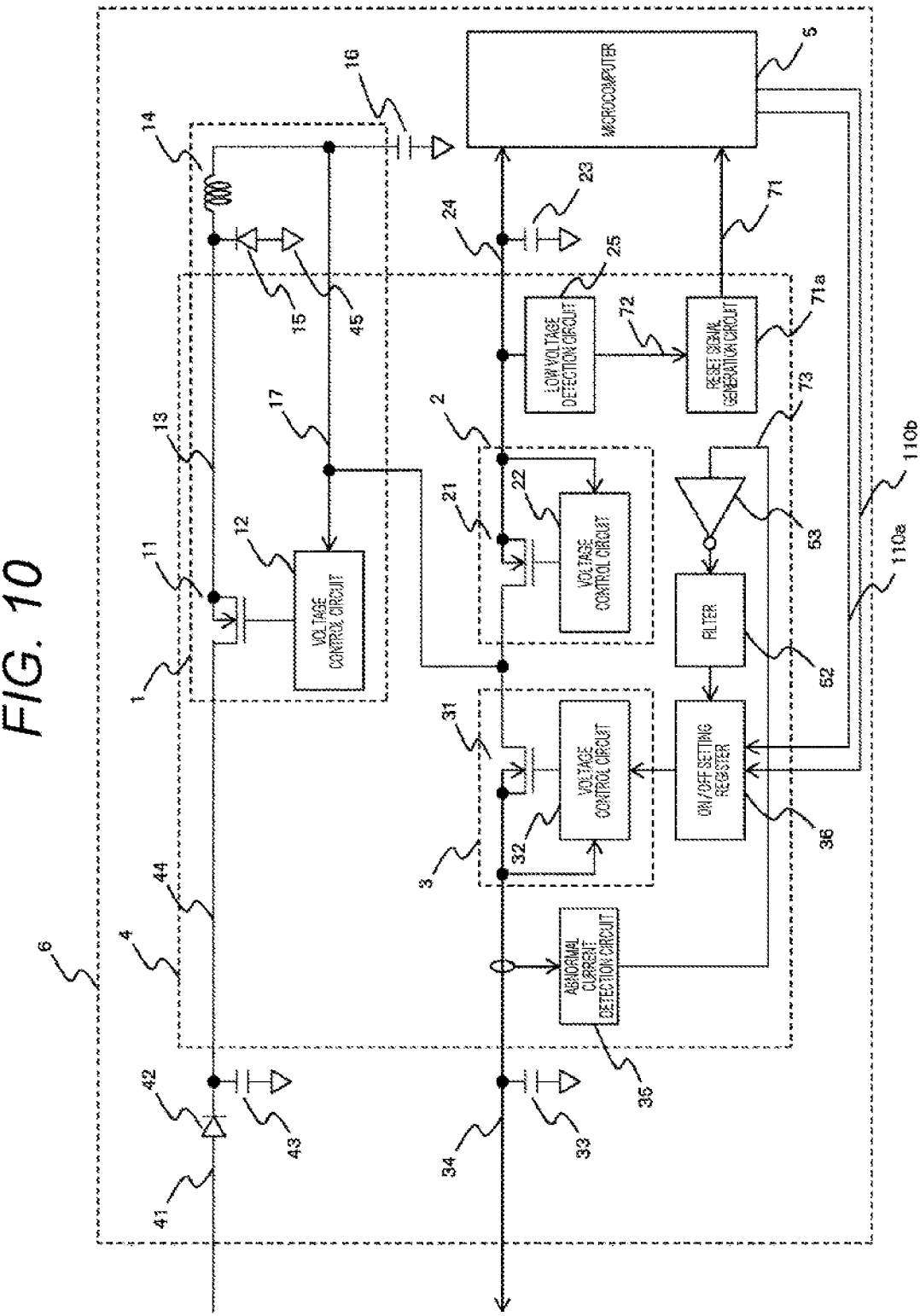
FIG. 10 is a diagram illustrating a configuration of a power supply control device according to a fifth embodiment.

FIG. 10 is a diagram illustrating a configuration of an electronic control device according to a fifth embodiment.

In describing the fifth embodiment, a difference from the first to fourth embodiments will be described and the same details will not be repeated.

The fifth embodiment employs a configuration in which the third power supply abnormal output current detection output signal 73 detected by the third power supply abnormal current detection circuit 35 is input to a filter circuit 52 via an inverter circuit 53. In addition, a third power supply output-ON control signal 110a is input to the voltage generating function control register 36. The power supply output-ON control signal is a register setting signal and is generally input from an external control device such as a CPU.

The others are the same as in the first to fourth embodiments.

An operation in the fifth embodiment will be described below with reference to the timing chart illustrated in FIG. 11.

Figure 11:
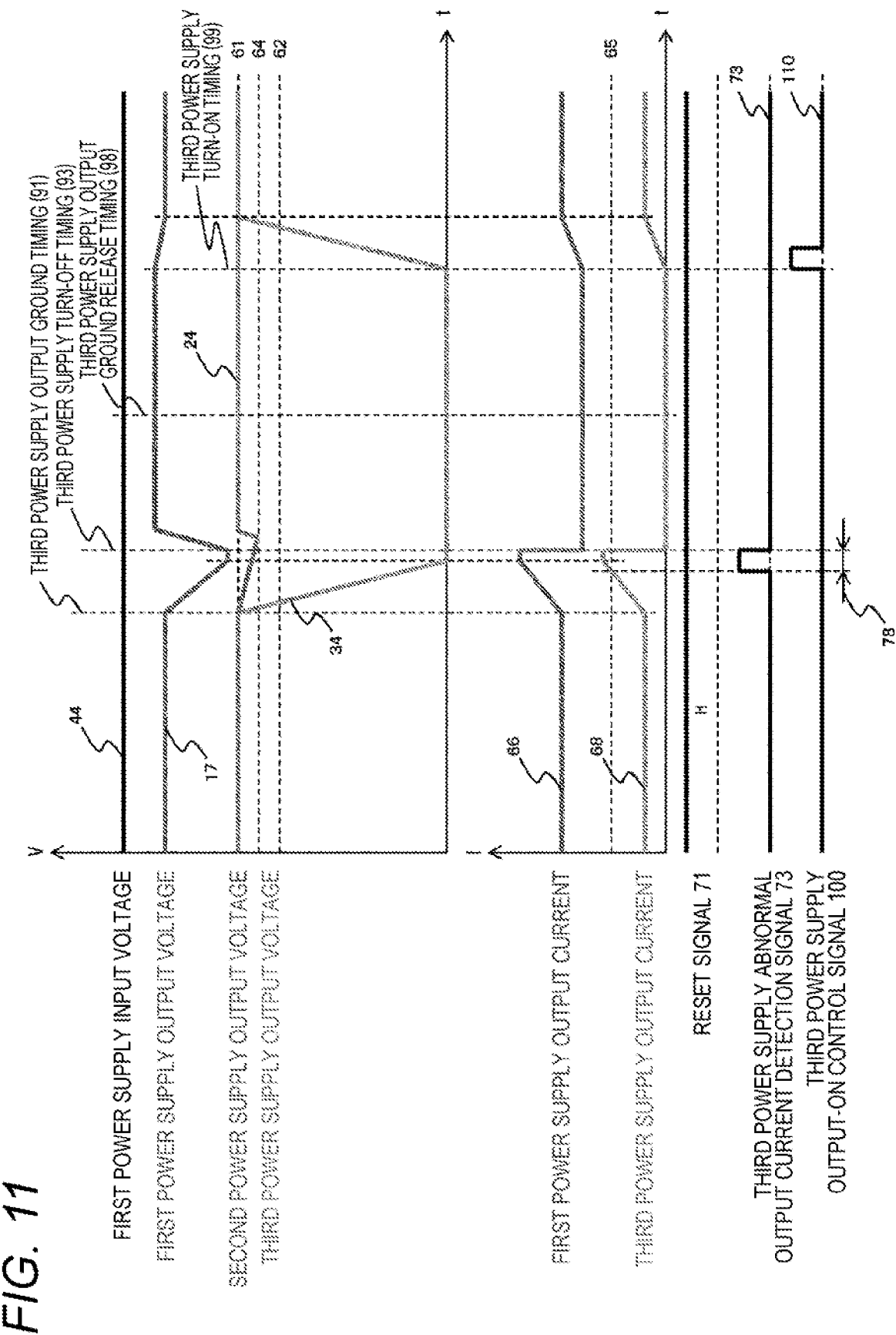
FIG. 11 is a timing chart illustrating advantages of the fifth embodiment.

FIG. 11 illustrates a state in which the third power supply output voltage 34 is grounded when the first power supply input voltage 44 is at a low level. When the third power supply output voltage 34 is grounded at the third power supply output ground timing 91 in a state in which the first power supply input voltage 44 is at the low level, the third power supply output current 68 increases (the short-circuit current flows) as illustrated in FIG. 11. When the third power supply output current 68 reaches the third power supply abnormal output current detection threshold 65, this state is detected and the third power supply abnormal output current detection output signal 73 is output.

Accordingly, similar to the first embodiment, the third power supply abnormal output current detection output signal 73 is output, and the third power supply 3 is turned off at the third power supply OFF timing 93 after the inverter output signal filtering time 78 by the filter circuit 52 elapses to stop the third power supply output current 68 and to decrease the first power supply output current 66. Accordingly, since drop of the first power supply output voltage 17 and drop of the second power supply output voltage 24 due to the short-circuit current do not occur as illustrated in FIG. 11, the second power supply 2 can control the second power supply output voltage 24 to a predetermined voltage. As a result, the reset signal 71 can be kept at a high level.

Accordingly, even when a ground failure occurs in the third power supply output voltage 34 within the battery voltage range in which the operation of the electronic control device is guaranteed, the power supply control device of the electronic control device according to the present invention can maintain supply of appropriate voltage and current to the microcontroller and does not output a reset signal, and thus the electronic control device can function normally.

The fifth embodiment provides the following advantages.

In the fifth embodiment, the third power supply 3 is turned off using the third power supply abnormal output current detection output signal 73. Accordingly, when the power supply is turned off, the current value is zero and thus the third power supply abnormal output current detection output signal 73 is returned to a normal state. Then, since the operation of controlling the third power supply 3 to be turned on again and to allow the short-circuit current to flow and outputting the third power supply abnormal output current detection output signal 73 again to turn off the third power supply 3 is repeated, this operation is repeated until the short-circuit state of the third power supply 3 is released.

In the fifth embodiment, the third power supply output-ON control signal 110a is input to the voltage generating function control register 36. Accordingly, when the third power supply 3 is once turned off using the third power supply abnormal output current detection output signal 73 and then the third power supply 3 is turned on, the third power supply output-ON control signal 110a is input to turn on the third power supply 3 again as indicated by a third power supply ON timing 99 in FIG. 11. Accordingly, it is possible to avoid the operation of repeating the ON state and the OFF state until the short-circuit state of the third power supply 3 is released as described above.

The advantages described in the fifth embodiment can also be achieved in the configurations described in the first to fourth embodiments.

Sixth Embodiment

Figure 12:
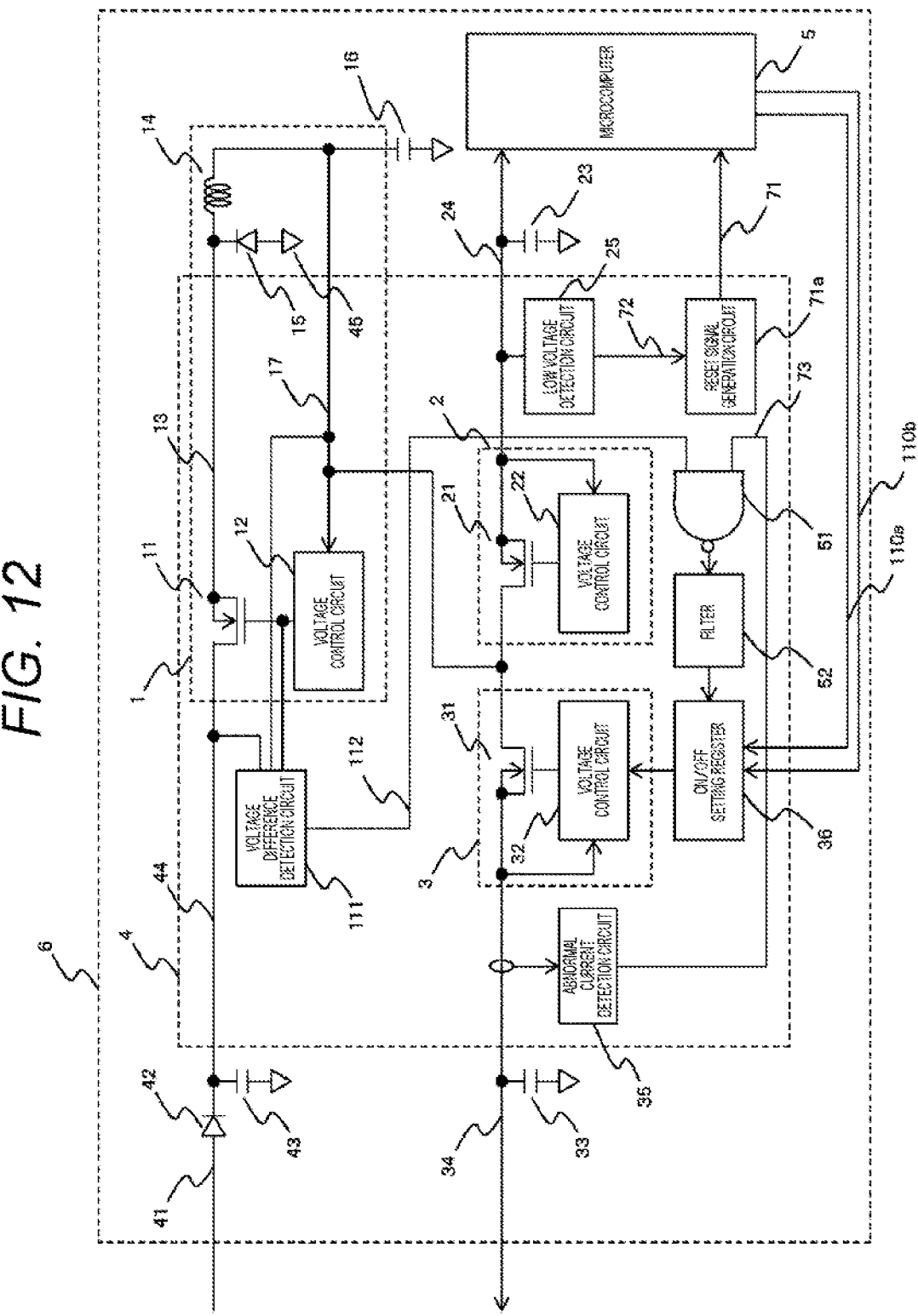
FIG. 12 is a diagram illustrating a configuration of a power supply control device according to a sixth embodiment.

FIG. 12 is a diagram illustrating a configuration of an electronic control device according to a sixth embodiment.

In describing the sixth embodiment, a difference from the first to fifth embodiments will be described and the same details will not be repeated.

The sixth embodiment is different from the first to fifth embodiments, in that a first power supply input and output voltage difference detection circuit 111 configured to compare the first power supply input voltage 44 and the first power supply output voltage 17 is provided and outputs a first power supply input and output voltage difference detection signal 112. At this time, in order to detect that the first power supply 1 is in a fully turned-on state, the driving signal of the switching element 11 is also input to the first power supply input and output voltage difference detection circuit 111. The others are the same as in the first to fifth embodiments.

An operation in the sixth embodiment will be described below with reference to the timing chart illustrated in FIG. 13.

Figure 13:
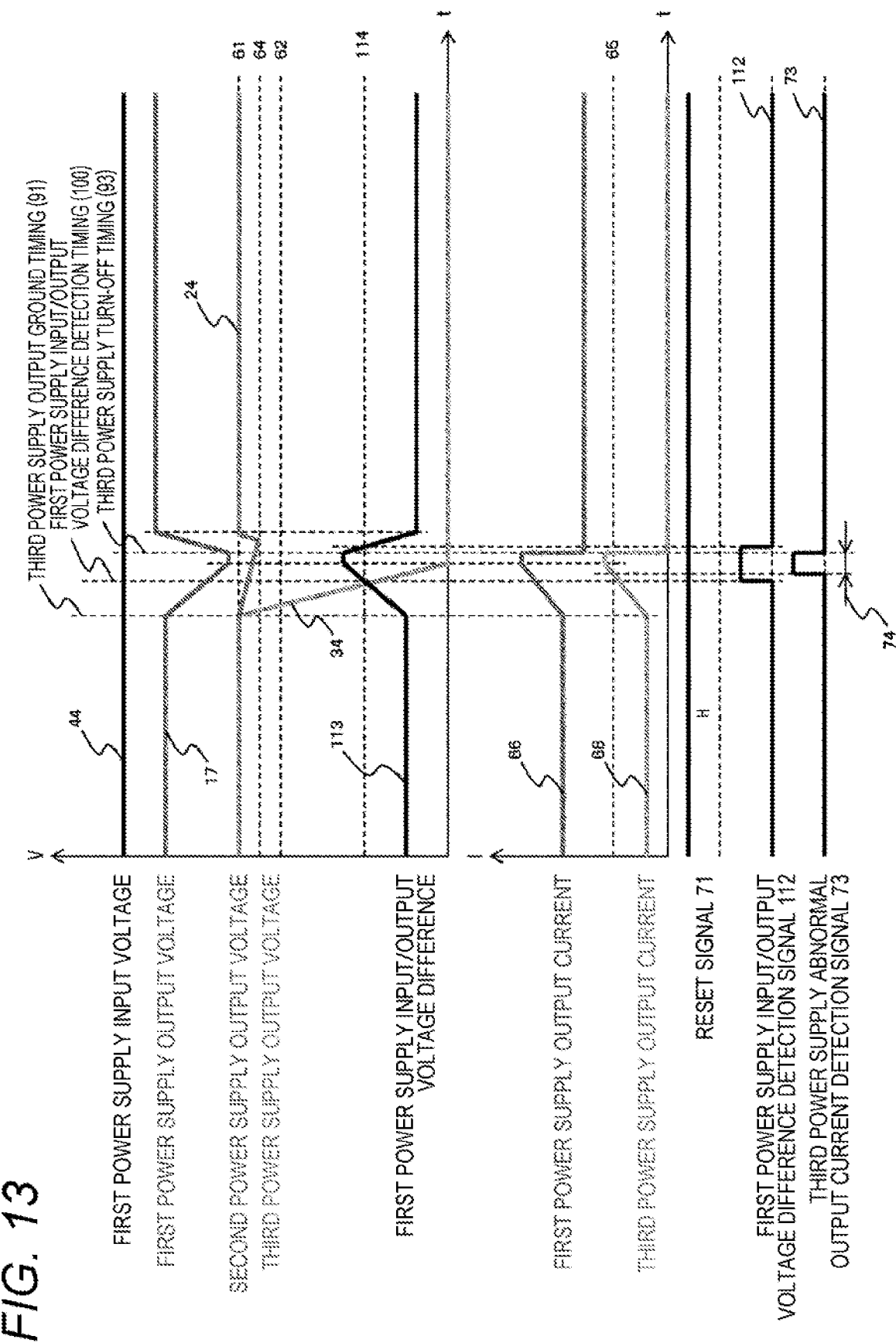
FIG. 13 is a timing chart illustrating advantages of the sixth embodiment.

FIG. 13 illustrates a state in which the third power supply output voltage 34 is grounded when the first power supply input voltage 44 is at a low level. When the third power supply output voltage 34 is grounded at the third power supply output ground timing 91 in a state in which the first power supply input voltage 44 is at the low level, the third power supply output current 68 increases (the short-circuit current flows) as illustrated in FIG. 13. When the third power supply output current 68 reaches the third power supply abnormal output current detection threshold 65, this state is detected and the third power supply abnormal output current detection output signal 73 is output.

On the other hand, when the third power supply output current 68 increases due to the grounding of the third power supply output voltage 34, the first power supply output voltage 17 also decreases similar to the first embodiment. The first power supply output voltage 17 is input to the first power supply input and output voltage difference detection circuit 111, and when the first power supply output voltage 17 reaches a first power supply input and output voltage difference detection threshold 114 set in the first power supply input and output voltage difference detection circuit 111, the first power supply input and output voltage difference detection signal 112 is output at a first power supply input and output voltage difference detection timing 100. The potential difference is detected using the driving signal of the switching element 11 only when the switching element 11 is fully turned on.

Accordingly, similar to the first embodiment, the third power supply abnormal output current detection output signal and the first power supply input and output voltage difference detection signal 112 are simultaneously output, and the third power supply 3 is turned off at the third power supply OFF timing 93 to stop the third power supply output current 68 and to decrease the first power supply output current 66 after the NAND output signal filtering time 74 elapses. Accordingly, since drop of the first power supply output voltage 17 and drop of the second power supply output voltage 24 due to the short-circuit current do not occur as illustrated in FIG. 13, the second power supply 2 can control the second power supply output voltage 24 to a predetermined voltage. As a result, the reset signal 71 can be kept at a high level.

Accordingly, even when a ground failure occurs in the third power supply output voltage 34 within the battery voltage range in which the operation of the electronic control device is guaranteed, the power supply control device of the electronic control device according to the present invention can maintain supply of appropriate voltage and current to the microcontroller and does not output a reset signal, and thus the electronic control device can function normally.

Seventh Embodiment

Figure 14:
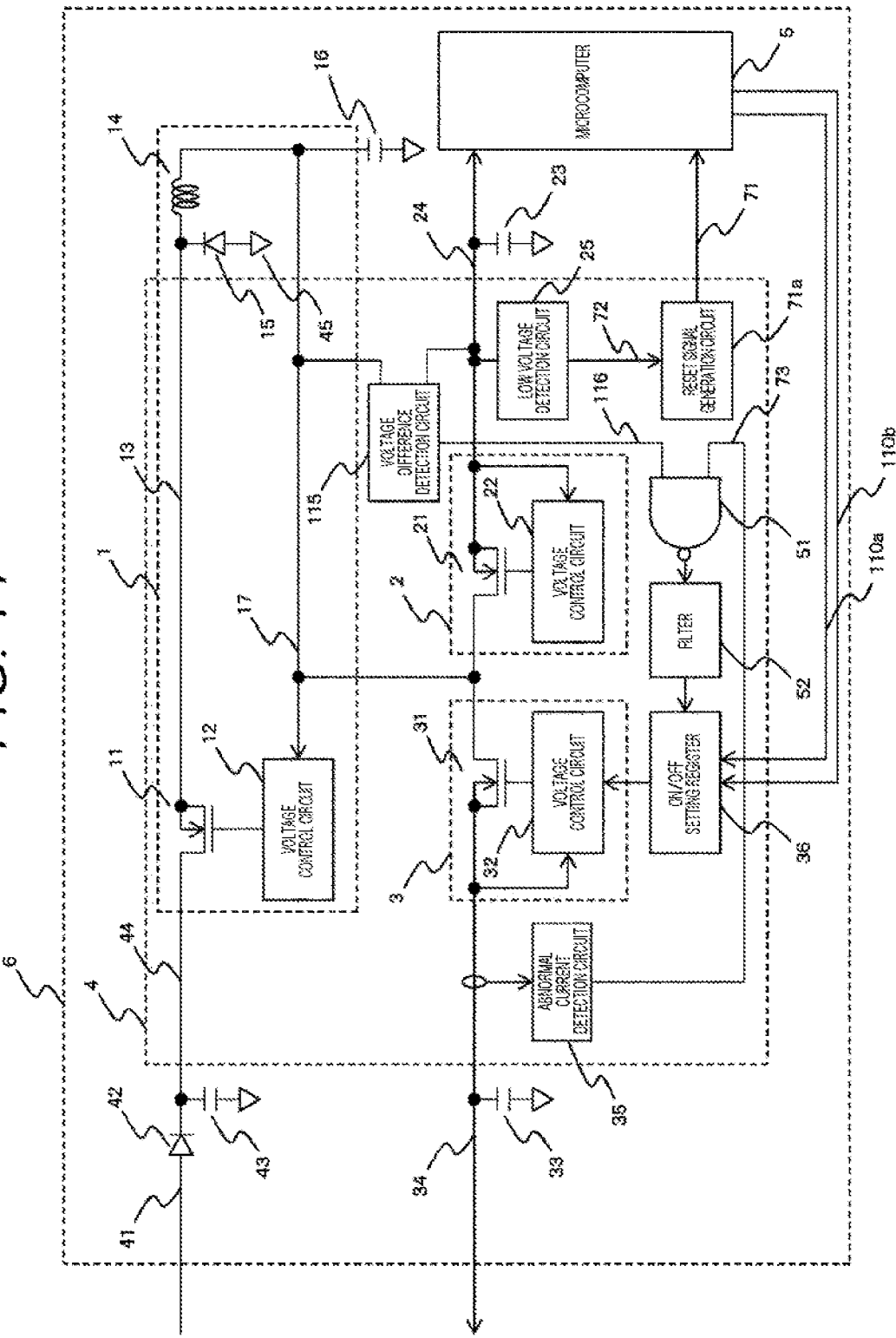
FIG. 14 is a diagram illustrating a configuration of a power supply control device according to a seventh embodiment.

FIG. 14 is a diagram illustrating a configuration of an electronic control device according to a seventh embodiment.

In describing the seventh embodiment, a difference from the first to sixth embodiments will be described and the same details will not be repeated.

The seventh embodiment is different from the first to sixth embodiments, in that a second power supply input and output voltage difference detection circuit 115 configured to compare the second power supply output voltage 24 with the first power supply output voltage 17 which is the second power supply input voltage is provided and outputs a second power supply input and output voltage difference detection signal 116. The others are the same as in the first to sixth embodiments.

An operation in the seventh embodiment will be described below with reference to the timing chart illustrated in FIG. 15.

Figure 15:
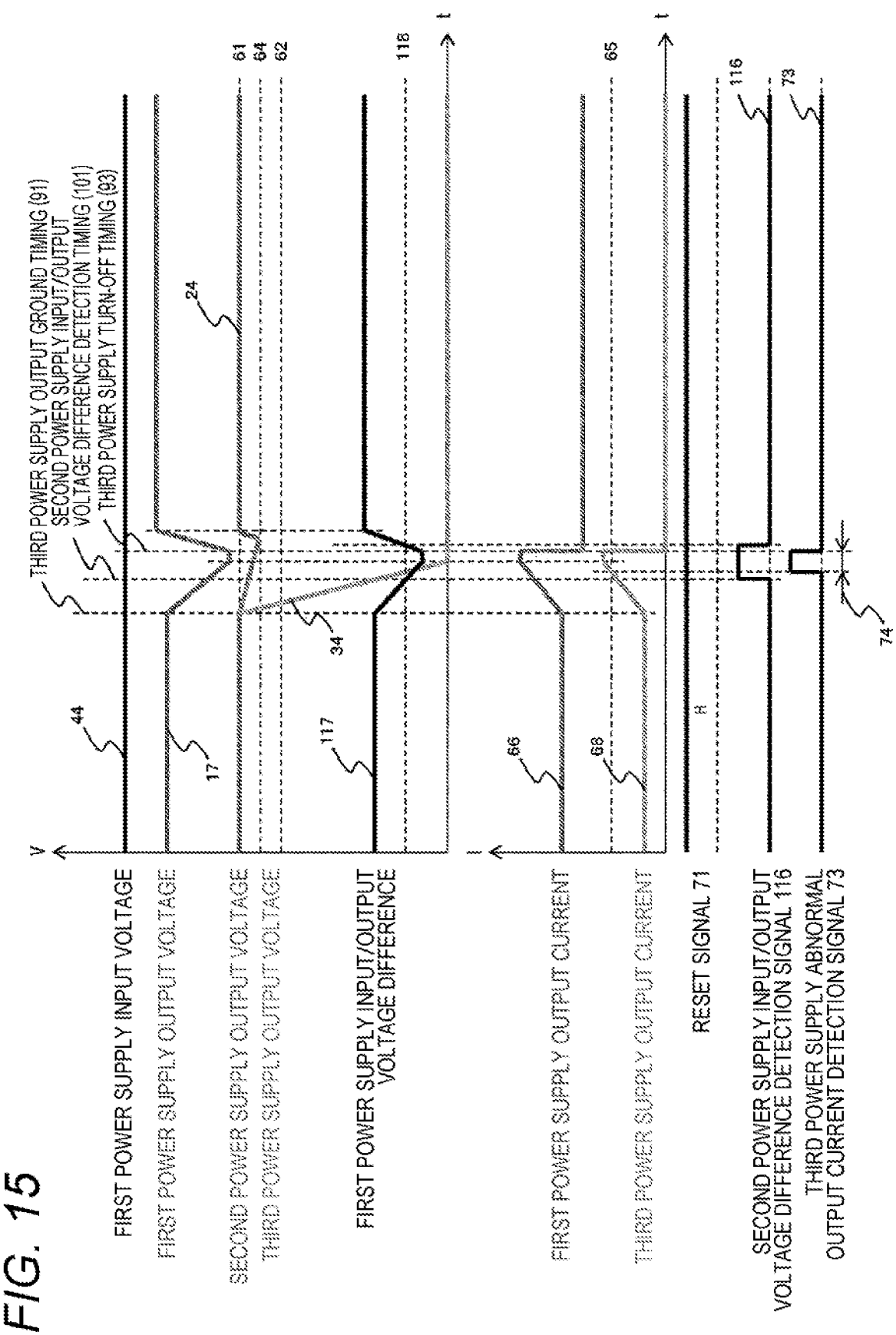
FIG. 15 is a timing chart illustrating advantages of the seventh embodiment.

FIG. 15 illustrates a state in which the third power supply output voltage 34 is grounded when the first power supply input voltage 44 is at a low level. When the third power supply output voltage 34 is grounded at the third power supply output ground timing 91 in a state in which the first power supply input voltage 44 is at the low level, the third power supply output current 68 increases (the short-circuit current flows) as illustrated in FIG. 15. When the third power supply output current 68 reaches the third power supply abnormal output current detection threshold 65, this state is detected and the third power supply abnormal output current detection output signal 73 is output.

On the other hand, when the third power supply output current 68 increases due to the grounding of the third power supply output voltage 34, the first power supply output voltage 17 and the second power supply output voltage 24 also decrease similar to the first embodiment. These voltages are input to the second power supply input and output voltage difference detection circuit 115, and when the voltages reach a second power supply input and output voltage difference detection threshold 118 set in the second power supply input and output voltage difference detection circuit 115, the first power supply input and output voltage difference detection signal 116 is output at a second power supply input and output voltage difference detection timing 101.

Accordingly, similar to the first embodiment, the third power supply abnormal output current detection output signal 73 and the second power supply input and output voltage difference detection signal 116 are simultaneously output, and the third power supply 3 is turned off at the third power supply OFF timing 93 to stop the third power supply output current 68 and to decrease the first power supply output current 66 after the NAND output signal filtering time 74 elapses. Accordingly, since drop of the first power supply output voltage 17 and drop of the second power supply output voltage 24 due to the short-circuit current do not occur as illustrated in FIG. 15, the second power supply 2 can control the second power supply output voltage 24 to a predetermined voltage. As a result, the reset signal 71 can be kept at a high level.

Accordingly, even when a ground failure occurs in the third power supply output voltage 34 within the battery voltage range in which the operation of the electronic control device is guaranteed, the electronic control device according to the present invention can maintain supply of appropriate voltage and current to the microcontroller and does not output a reset signal, and thus the electronic control device can function normally.

Eighth Embodiment

Figure 16:
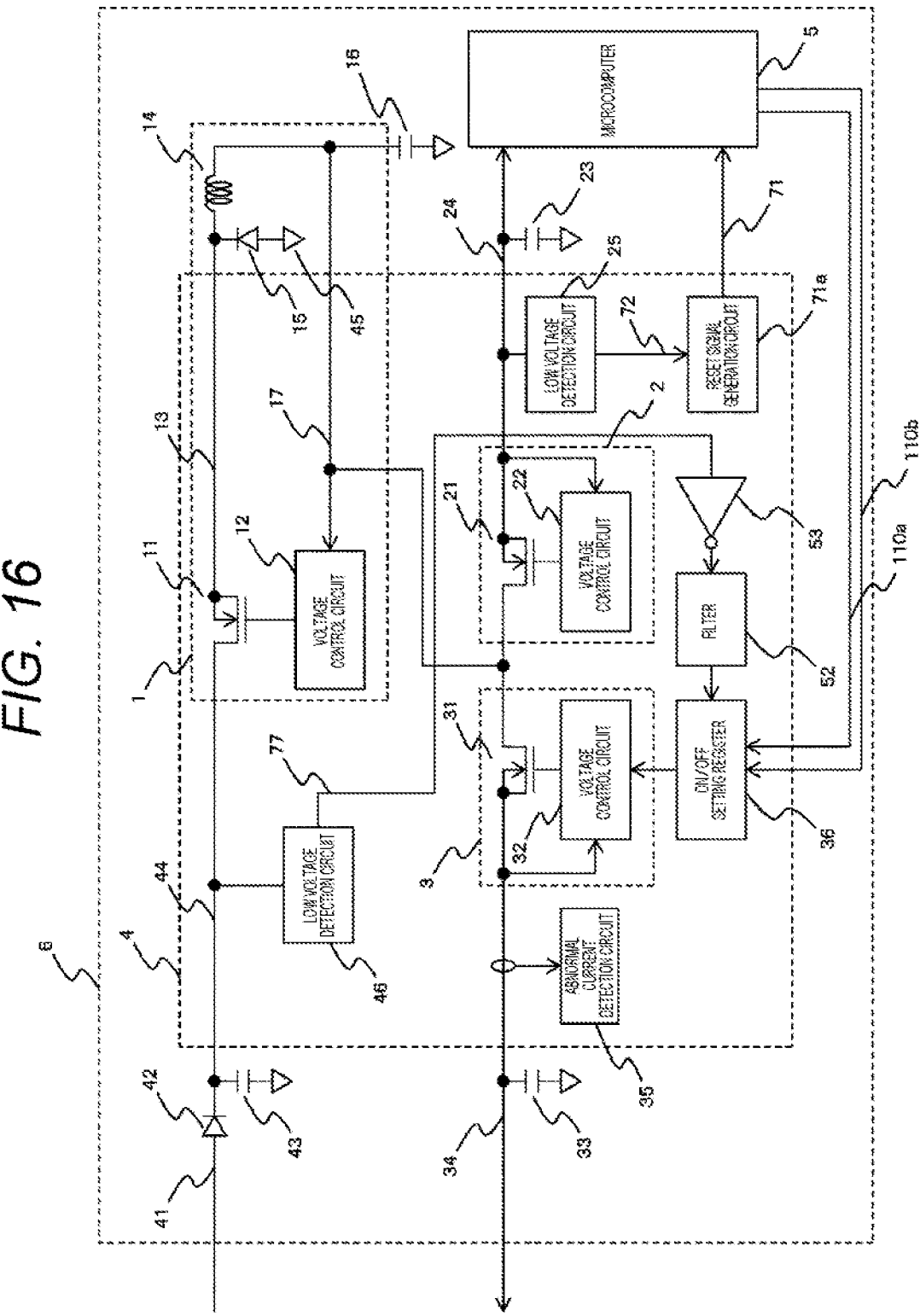
FIG. 16 is a diagram illustrating a configuration of a power supply control device according to an eighth embodiment.
Figure 17:
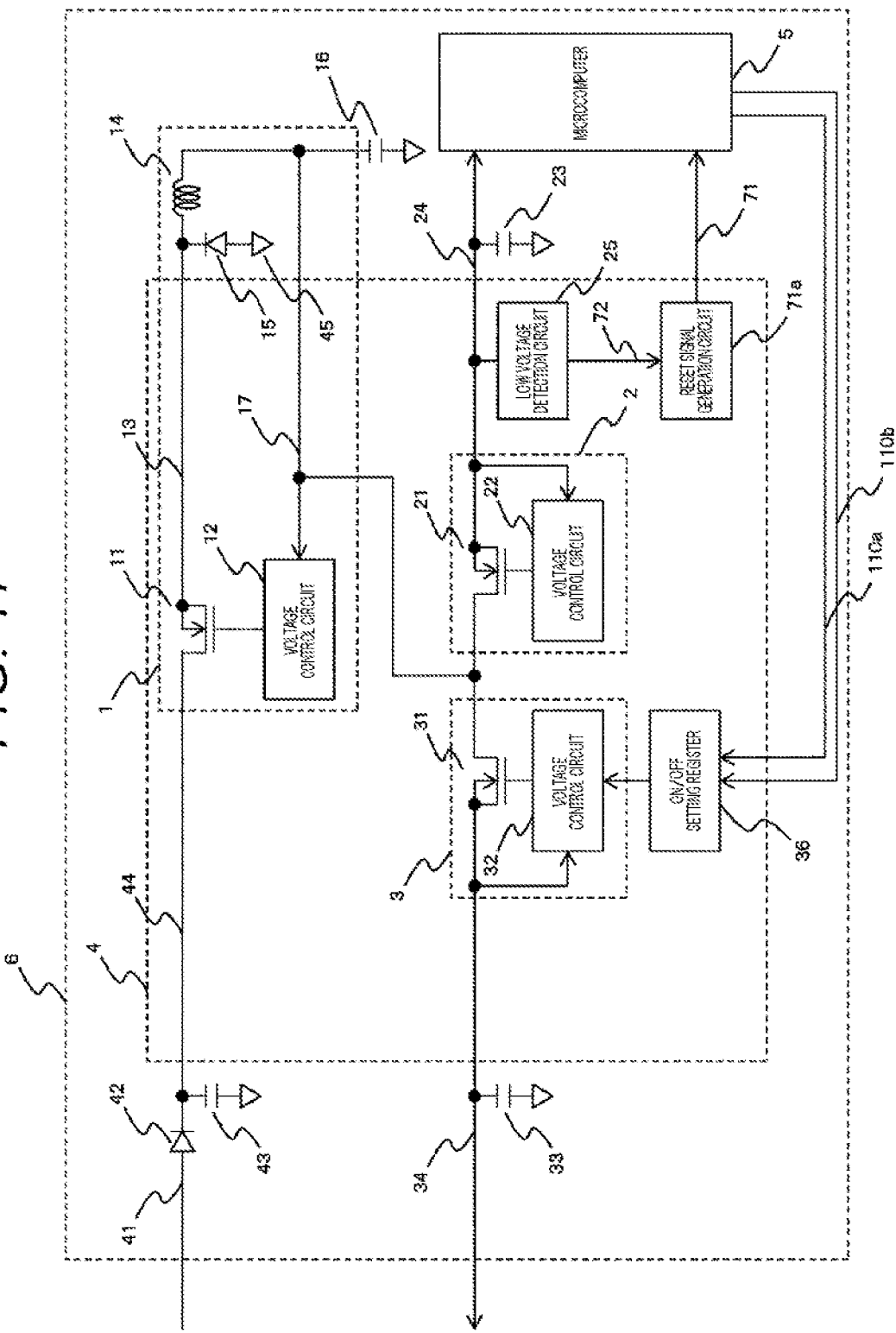
FIG. 17 is a diagram illustrating a configuration of a power supply control device according to a conventional example.
Figure 18:
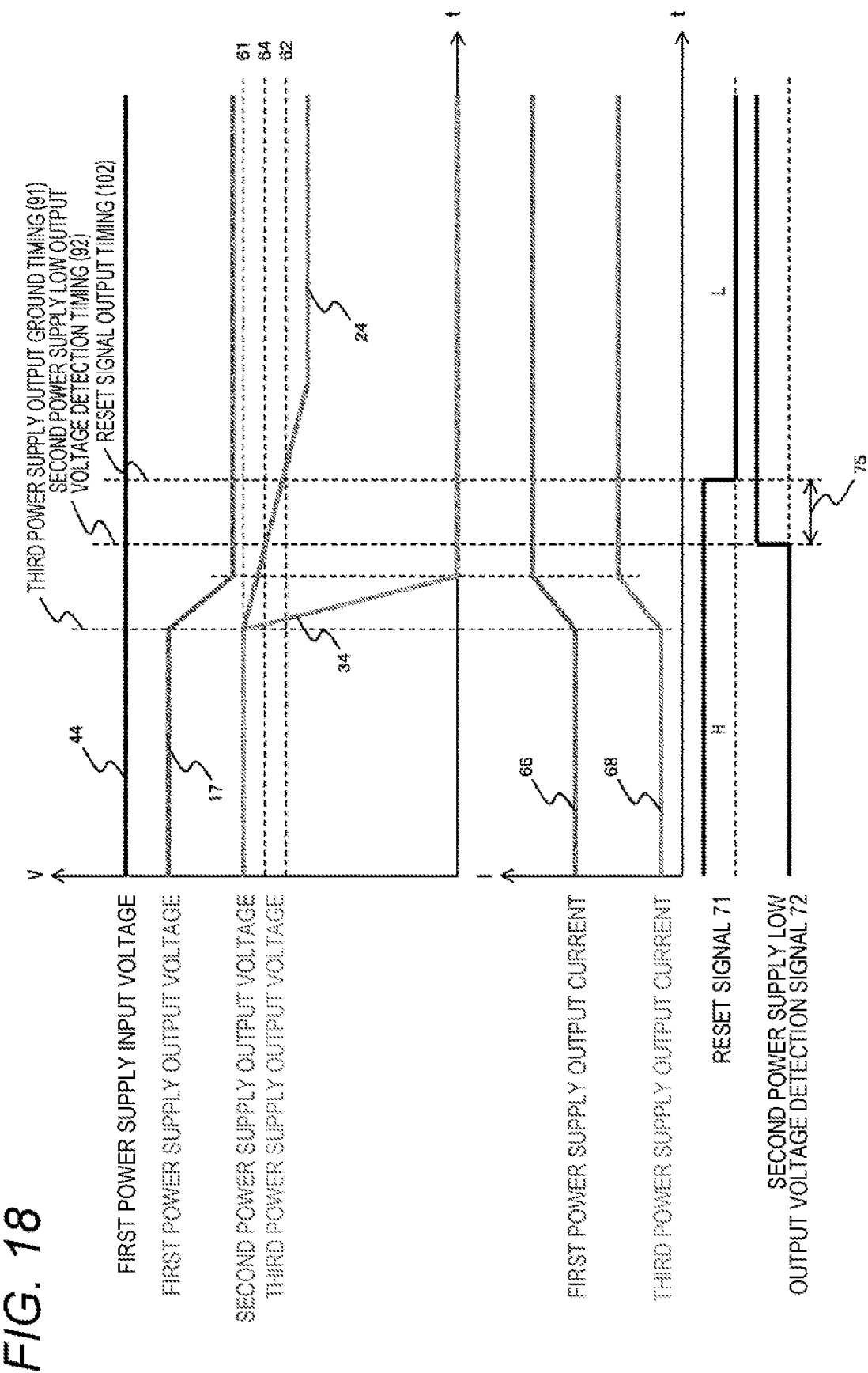
FIG. 18 is a timing chart illustrating a conventional example.
Figure 19:
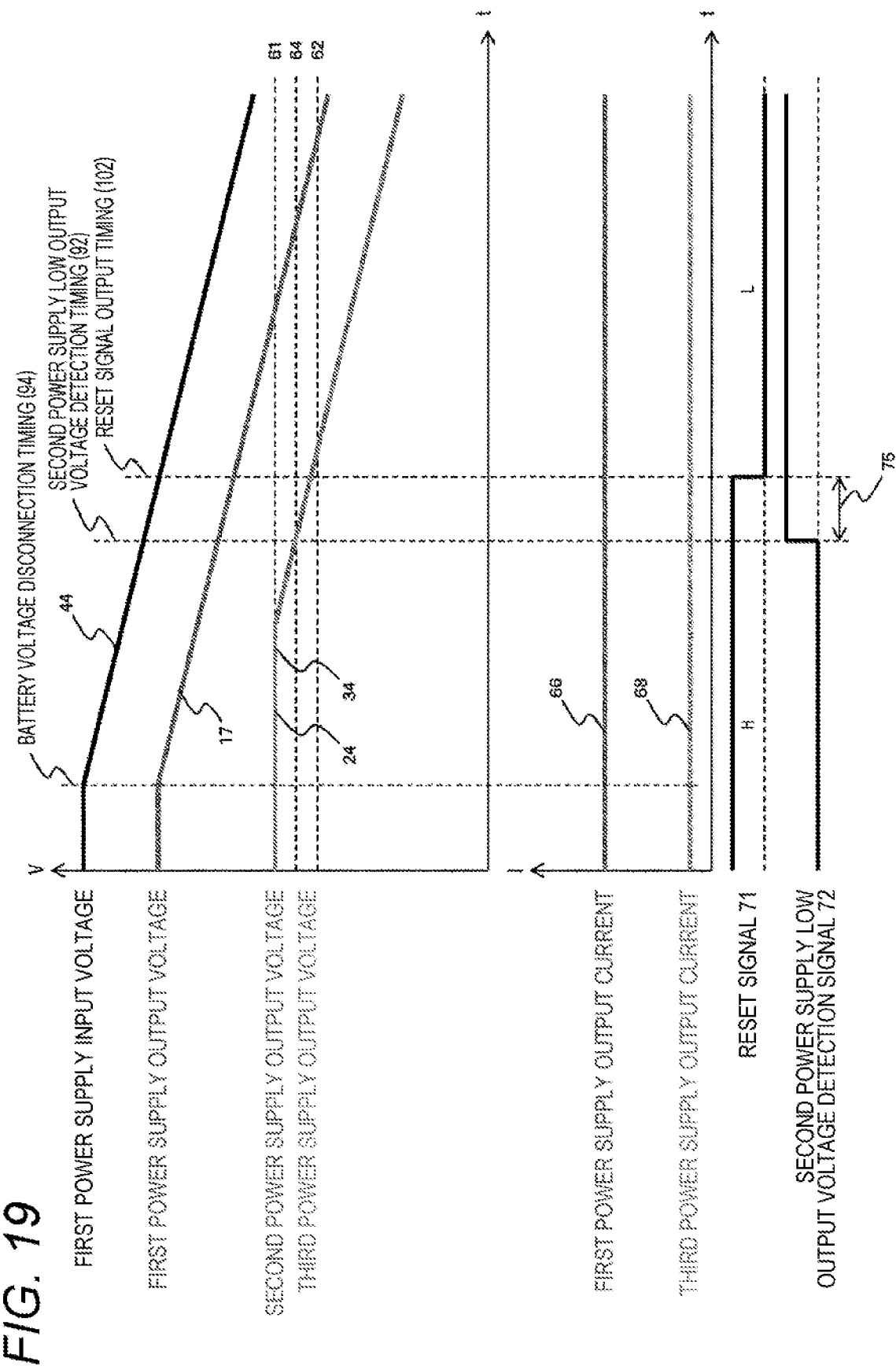
FIG. 19 is a timing chart illustrating a conventional example.
Figure 20:
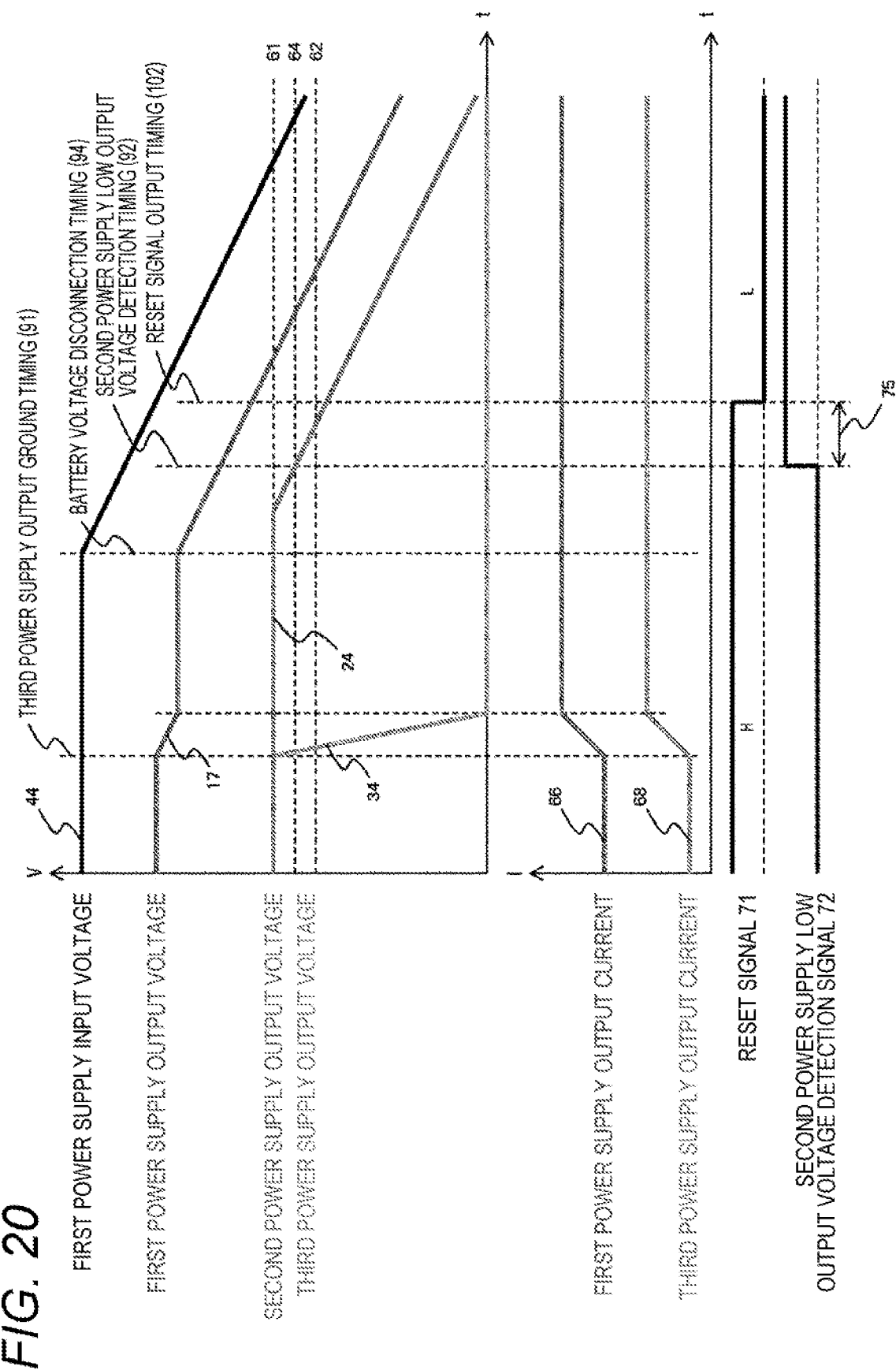
FIG. 20 is a timing chart illustrating a conventional example.

FIG. 16 is a diagram illustrating a configuration of an electronic control device according to an eighth embodiment.

In describing the eighth embodiment, a difference from the first to seventh embodiments will be described and the same details will not be repeated.

The eighth embodiment employs a configuration in which first power supply low input voltage detection output signal 77 detected by the first power supply low input voltage detection circuit 46 is input to the filter circuit 52 via the inverter circuit 53. The others are the same as in the first to seventh embodiments.

An operation when the power supply control device is started will be described. The power supply control device starts control of the power supplies in response to a power supply control device permission signal which is not illustrated. In the configuration of the power supply control device, the first power supply 1 first starts its operation and the second power supply 2 and the third power supply 3 start their operations when the first power supply output voltage 17 reaches a predetermined voltage. That is, regarding the third power supply 3, when the power supply control device is started, the voltage generating function control register 36 is automatically set to a high level and the third power supply 3 starts its operation.

A case in which the first power supply input voltage 44 is at a low level when the power supply control device is started will be described below. In this case, when the voltage generating function control register 36 is automatically set to a high level, the first power supply output voltage 17 decreases with the increase of the third power supply output current 68 and the second power supply input voltage is insufficient. Accordingly, there is a possibility that the second power supply output voltage 24 is not higher than the second power supply low output voltage detection threshold 64 and the reset signal 71 is in a high state. Particularly, when the power supply control device is started in a state in which the third power supply output voltage 34 is grounded, the third power supply output current 68 is larger than current consumption of the power supply target and thus the above-mentioned possibility increases.

In the eighth embodiment, the first power supply low input voltage detection output signal 77 is input to the voltage generating function control register 36 via the inverter circuit 53 and the filter circuit 52. By employing this configuration, when the first power supply input voltage 44 is at a low level at the time of starting of the power supply control device, the first power supply low input voltage detection circuit 46 detects that the first power supply input voltage 44 is at a low level and outputs the first power supply low input voltage detection output signal 77, thereby preventing the voltage generating function control register 36 from being automatically set to a high level.

Accordingly, even when the first power supply input voltage 44 is at a low level at the time of starting of the power supply control device, it is possible to lower the possibility that the above-mentioned reset signal 71 will not become a high level by reducing contribution of the first power supply output current 66 to the third power supply output current 68.

The advantages described in the eighth embodiment can be achieved in the configurations described in the first to seventh embodiments.

REFERENCE SIGNS LIST 1 first power supply
2 second power supply
3 third power supply
4 power supply control device
5 microcontroller
6 electronic control device
11 switching element
12 first voltage control circuit
13 switching output voltage
14 inductor
15 freewheel diode
16 first power supply output capacitor
17 first power supply output voltage
18 first power supply low output voltage detection circuit
21 second power supply output transistor
22 second voltage control circuit
23 second power supply output capacitor
24 second power supply output voltage
25 second power supply low output voltage detection circuit
31 third power supply output transistor
32 third voltage control circuit
33 third power supply output capacitor
34 third power supply output voltage
35 third power supply abnormal current detection circuit
36 voltage generating function control register
37 third power supply over-temperature detection circuit
41 battery voltage
42 reverse connection prevention diode
43 power supply control device input capacitor
44 first power supply input voltage
45 reference potential
46 first power supply low input voltage detection circuit
51 NAND circuit
52 filter circuit
53 inverter circuit
61 control voltage for second power supply and third power supply
62 microcontroller guaranteed operating voltage range lower limit
63 microcontroller guaranteed operating voltage range upper limit
64 second power supply low output voltage detection threshold
65 third power supply abnormal output current detection threshold
66 first power supply output current
67 second power supply output current
68 third power supply output current
69 first power supply low output voltage detection threshold
70 first power supply low input voltage detection threshold
71 reset signal
71a reset signal generation circuit
72 second power supply low output voltage detection output signal
73 third power supply abnormal output current detection output signal
74 NAND output signal filtering time
75 reset signal generation filtering time
76 first power supply low output voltage detection output signal
77 first power supply low input voltage detection output signal
78 inverter output signal filtering time
81 third power supply over-temperature detection output signal
82 third power supply over-temperature detection threshold
83 third power supply temperature
91 third power supply output ground timing
92 second power supply low output voltage detection timing
93 third power supply OFF timing
94 battery voltage disconnection timing
95 first power supply low output voltage detection timing
96 first power supply low input voltage detection timing
97 third power supply over-temperature detection timing
98 third power supply output ground release timing
99 third power supply ON timing
100 first power supply input and output voltage difference detection timing
101 second power supply input and output voltage difference detection timing
102 reset signal output timing
110a third power supply output-ON control signal
110b third power supply output-OFF control signal
111 first power supply input and output voltage difference detection circuit
112 first power supply input and output voltage difference detection signal
113 first power supply input and output voltage difference
114 first power supply input and output voltage difference detection threshold
115 second power supply input and output voltage difference detection circuit
116 second power supply input and output voltage difference detection signal
117 second power supply input and output voltage difference
118 second power supply input and output voltage difference detection threshold

The invention claimed is:

1. An electronic control device comprising:
an operation processing unit;
a first power supply circuit that outputs a predetermined voltage;
a second power supply circuit that is disposed downstream from the first power supply circuit and outputs a predetermined voltage to the operation processing unit; and
a third power supply circuit that is disposed downstream from the first power supply circuit and outputs a predetermined voltage, wherein a circuit operating state of the third power supply circuit is switched depending on a state of the first power supply circuit, the second power supply circuit, or the third power supply circuit; and
a detection circuit configured to detect a ground failure of the third power supply circuit,
wherein when the detection circuit detects the ground failure of the third power supply circuit, the third power supply circuit is being controlled to stop a third power supply output current of the third power supply circuit so as to decrease a first power supply output current of the first power supply circuit.

2. The electronic control device according to claim 1, further comprising a circuit configured to generate a state detection signal on the basis of the state of the third power supply circuit, wherein the circuit operating state of the third power supply circuit is switched on the basis of the state detection signal.

3. The electronic control device according to claim 1, further comprising a circuit configured to detect the state of the third power supply circuit, wherein the circuit is further configured to:

monitor an output current of the third power supply circuit, and generate an abnormal current detection signal of the third power supply circuit on the basis of the output current of the third power supply circuit.

4. The electronic control device according to claim 1, further comprising a circuit configured to detect the state of the third power supply circuit, wherein the circuit is further configured to:

monitor a temperature of the third power supply circuit, and generate an over-temperature detection signal of the third power supply circuit on the basis of the temperature of the third power supply circuit.

5. The electronic control device according to claim 1, further comprising a circuit configured to generate a voltage detection signal for at least one of input voltages and output voltages of the first to third power supply circuits, wherein the circuit operating state of the third power supply circuit is switched on the basis of the state detection signal and the voltage detection signal.

6. The electronic control device according to claim 1, further comprising a circuit configured to:

monitor at least one of the first and second power supply output voltages supply circuits, and generate a first or second power supply low output voltage detection signal on the basis of the output voltage of the first or second power supply output voltages.

7. The electronic control device according to claim 1, further comprising a circuit configured to:

monitor a first power supply input voltage; and generate a first power supply low input voltage detection signal on the basis of the first power supply input voltage.

8. The electronic control device according to claim 1, further comprising a circuit configured to switch a circuit starting state of the third power supply circuit depending on states of input voltages or output voltages after the first to third power supply circuits start their operation.

9. The electronic control device according to claim 1, wherein the third power supply circuit includes a circuit configured to externally switch the circuit operating state of the third power supply circuit.

10. The electronic control device according to claim 1, wherein the operation processing unit comprises a microcontroller configured to perform various operations, and the electronic control device further comprising:

a circuit configured to monitor a second power supply output voltage and to output an initialization signal to the microcontroller when the second power supply output voltage is lower than a predetermined voltage.

11. An electronic control device comprising:

an operation processing unit;

a first power supply circuit configured to output a predetermined voltage;

a second power supply circuit that is disposed downstream from the first power supply circuit and configured to output a predetermined voltage to the operation processing unit;

a third power supply circuit that is disposed downstream from the first power supply circuit and configured to output a predetermined voltage; and a detection circuit configured to detect a ground failure of the third power supply circuit, wherein when the detection circuit detects the ground failure of the third power supply circuit, the third power supply circuit is being controlled to stop a third power supply output current of the third power supply circuit so as to decrease a first power supply output current of the first power supply circuit.

12. The electronic control device according to claim 1, wherein the circuit operating state of the third power supply circuit is switched depending on a state of the first power supply circuit, a state of the second power supply circuit, and a state of the third power supply circuit.

* * * * *